US010528974B2

United States Patent
Celik et al.

(10) Patent No.: US 10,528,974 B2
(45) Date of Patent: *Jan. 7, 2020

(54) INTERACTIVE CAMPAIGN-BASED CUSTOMER FEEDBACK COLLECTION PLATFORM

(71) Applicant: OnePIN, Inc., Westborough, MA (US)

(72) Inventors: Feyzi Celik, Hopkinton, MA (US); Marcin Nowak, Westborough, MA (US)

(73) Assignee: OnePIN, Inc., Westborough, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/199,988

(22) Filed: Nov. 26, 2018

(65) Prior Publication Data
US 2019/0095936 A1    Mar. 28, 2019

Related U.S. Application Data

(63) Continuation of application No. 15/888,379, filed on Feb. 5, 2018, now Pat. No. 10,147,106, which is a
(Continued)

(51) Int. Cl.
*G06Q 30/02* (2012.01)
*H04M 15/00* (2006.01)
(Continued)

(52) U.S. Cl.
CPC ......... *G06Q 30/0251* (2013.01); *G06F 9/542* (2013.01); *G06F 16/972* (2019.01);
(Continued)

(58) Field of Classification Search
CPC ........... H04W 4/00; H04W 4/14; H04W 4/21; H04W 8/18; H04W 8/26; H04M 7/0042;
(Continued)

(56) References Cited

U.S. PATENT DOCUMENTS 7,924,989 B1    4/2011   Cooper
8,073,460 B1   12/2011   Scofield et al.
(Continued)

FOREIGN PATENT DOCUMENTS

WO   WO2009/023591   2/2009
WO   2012047273 A1   4/2012
(Continued)

OTHER PUBLICATIONS

International Search Report and Written Opinion, dated May 1, 2015, International Application No. PCTUS2015/010860, filed Jan. 9, 2015, 17 pages.
(Continued)

*Primary Examiner* — Wayne H Cai
(74) *Attorney, Agent, or Firm* — Giordano Law LLC

(57) ABSTRACT

This disclosure provides systems, methods, services, and platforms for prompting a user to respond to an offer on a mobile device. The disclosure enables Mobile Network Operators to create campaigns to target customers who are nearing the limit of their data plans, voice plans, SMS plans, and MMS plans. In some embodiments, the cloud server interacts with a client application to prompt the use of a mobile device to respond to an offer send in a campaign. The disclosure also provides embodiments to check to see if the user has opted out of receiving offers, or if a device can not execute a command, or if a threshold number of offers has already been sent. This disclosure also provides embodiments for authenticating third party account log-in.

14 Claims, 15 Drawing Sheets

Related U.S. Application Data continuation of application No. 15/146,597, filed on May 4, 2016, now Pat. No. 9,906,653.

(60) Provisional application No. 62/156,723, filed on May 4, 2015.

(51) Int. Cl.

| | | |
|---|---|---|
| *H04M 1/725* | (2006.01) | |
| *H04M 1/2745* | (2006.01) | |
| *H04M 3/42* | (2006.01) | |
| *H04M 3/493* | (2006.01) | |
| *H04W 4/14* | (2009.01) | |
| *G06Q 30/00* | (2012.01) | |
| *G06Q 50/00* | (2012.01) | |
| *H04W 8/18* | (2009.01) | |
| *H04W 8/26* | (2009.01) | |
| *H04M 7/00* | (2006.01) | |
| *G06F 16/958* | (2019.01) | |
| *G06F 9/54* | (2006.01) | |
| *H04W 4/60* | (2018.01) | |
| *H04W 4/16* | (2009.01) | |
| *H04W 4/21* | (2018.01) | |
| *H04W 4/00* | (2018.01) | |
| *G06F 16/955* | (2019.01) | |

(52) U.S. Cl.
CPC ......... *G06Q 30/01* (2013.01); *G06Q 30/0201* (2013.01); *G06Q 30/0203* (2013.01); *G06Q 30/0207* (2013.01); *G06Q 30/0245* (2013.01); *G06Q 30/0267* (2013.01); *G06Q 50/01* (2013.01); *H04M 1/274516* (2013.01); *H04M 1/72525* (2013.01); *H04M 1/72563* (2013.01); *H04M 3/42059* (2013.01); *H04M 3/42102* (2013.01); *H04M 3/42153* (2013.01); *H04M 3/42195* (2013.01); *H04M 3/42357* (2013.01); *H04M 3/42365* (2013.01); *H04M 3/4931* (2013.01); *H04M 7/0042* (2013.01); *H04M 15/58* (2013.01); *H04M 15/62* (2013.01); *H04M 15/705* (2013.01); *H04M 15/735* (2013.01); *H04M 15/7556* (2013.01); *H04M 15/80* (2013.01); *H04M 15/84* (2013.01); *H04M 15/844* (2013.01); *H04M 15/848* (2013.01); *H04M 15/852* (2013.01); *H04M 15/856* (2013.01); *H04W 4/14* (2013.01); *H04W 4/16* (2013.01); *H04W 4/60* (2018.02); *H04W 8/18* (2013.01); *H04W 8/26* (2013.01); *G06F 16/955* (2019.01); *G06Q 30/016* (2013.01); *H04M 1/72561* (2013.01); *H04M 2203/651* (2013.01); *H04M 2203/655* (2013.01); *H04M 2215/8158* (2013.01); *H04W 4/00* (2013.01); *H04W 4/21* (2018.02)

(58) Field of Classification Search
CPC ..... H04M 2203/651; H04M 2203/655; H04M 2215/8158; H04M 1/72563; H04M 1/72525; H04M 1/274516; H04M 1/72561; H04M 3/42059; H04M 3/42102; H04M 3/4931; H04M 15/844; H04M 15/852; H04M 15/80; H04M 15/848; H04M 15/58; H04M 15/84; G06Q 30/0203; G06Q 30/0267; G06Q 30/01; G06Q 30/0201; G06Q 30/016; G06Q 50/01

See application file for complete search history.

(56) References Cited

U.S. PATENT DOCUMENTS

| | | |
|---|---|---|
| 8,175,921 B1 | 5/2012 | Kopra |
| 8,249,627 B2 | 8/2012 | Olincy |
| 8,515,803 B2 | 8/2013 | Meyer et al. |
| 8,712,371 B2 | 4/2014 | Baker et al. |
| 8,934,876 B1 | 1/2015 | Cohen |
| 8,971,860 B1 | 3/2015 | Olincy |
| 8,989,712 B2 | 3/2015 | Wentker et al. |
| 2002/0159387 A1 | 10/2002 | Allison et al. |
| 2004/0252816 A1 | 12/2004 | Nicolas |
| 2005/0064879 A1 | 3/2005 | McAvoy |
| 2005/0186939 A1 | 8/2005 | Barnea et al. |
| 2005/0233733 A1 | 10/2005 | Roundtree et al. |
| 2005/0289095 A1 | 12/2005 | Ruahala et al. |
| 2006/0271425 A1 | 11/2006 | Goodman |
| 2006/0285661 A1 | 12/2006 | Patel et al. |
| 2007/0055995 A1 | 3/2007 | Jiang |
| 2007/0106698 A1 | 5/2007 | Elliott et al. |
| 2007/0111748 A1 | 5/2007 | Risbood |
| 2007/0281689 A1 | 12/2007 | Altman et al. |
| 2008/0037738 A1 | 2/2008 | Nolan et al. |
| 2008/0075249 A1 | 3/2008 | Zach et al. |
| 2008/0090597 A1 | 4/2008 | Celik et al. |
| 2008/0261635 A1* | 10/2008 | Samiri ............ G06Q 30/02 455/466 |
| 2008/0292080 A1 | 11/2008 | Quon et al. |
| 2008/0318554 A1 | 12/2008 | Romppanen et al. |
| 2008/0318555 A1 | 12/2008 | Romppanen et al. |
| 2009/0265220 A1 | 10/2009 | Bayraktar et al. |
| 2009/0280786 A1 | 11/2009 | Ziklik |
| 2009/0290701 A1 | 11/2009 | Portman et al. |
| 2009/0318122 A1 | 12/2009 | White et al. |
| 2010/0100387 A1 | 4/2010 | Kuiken et al. |
| 2010/0161506 A1 | 6/2010 | Bosenick et al. |
| 2010/0325221 A1 | 12/2010 | Cohen et al. |
| 2011/0029380 A1 | 2/2011 | Moukas et al. |
| 2011/0076989 A1 | 3/2011 | Lynch |
| 2011/0131421 A1 | 6/2011 | Jogand-Coulomb et al. |
| 2011/0151838 A1 | 6/2011 | Olincy |
| 2011/0151852 A1 | 6/2011 | Olincy |
| 2011/0287746 A1 | 11/2011 | Gopinath et al. |
| 2012/0057689 A1 | 3/2012 | Martin |
| 2012/0101989 A1 | 4/2012 | Ring et al. |
| 2012/0123870 A1 | 5/2012 | Denman et al. |
| 2012/0166271 A1 | 6/2012 | Wofford et al. |
| 2012/0238251 A1 | 9/2012 | Lee et al. |
| 2012/0315880 A1 | 12/2012 | Peitrow et al. |
| 2013/0086618 A1 | 4/2013 | Klein et al. |
| 2013/0115872 A1 | 5/2013 | Huang et al. |
| 2013/0130661 A1 | 5/2013 | Berner et al. |
| 2013/0204704 A1 | 8/2013 | Ross et al. |
| 2013/0217360 A1 | 8/2013 | Dakin et al. |
| 2013/0232008 A1 | 9/2013 | Macaluso |
| 2013/0238706 A1 | 9/2013 | Desai |
| 2013/0290820 A1 | 10/2013 | Dhanani |
| 2013/0343543 A1 | 12/2013 | Blaisdell et al. |
| 2014/0007214 A1 | 1/2014 | Qureshi et al. |
| 2014/0012686 A1* | 1/2014 | Arbon ............ G06Q 30/0277 705/14.73 |
| 2014/0026069 A1 | 1/2014 | Dennis |
| 2014/0057610 A1 | 2/2014 | Olincy |
| 2014/0156386 A1 | 6/2014 | Williams |
| 2014/0188612 A1 | 7/2014 | Chou et al. |
| 2014/0229238 A1 | 8/2014 | Meyer et al. |
| 2014/0229277 A1 | 8/2014 | Khambete |
| 2014/0257985 A1 | 9/2014 | Gibson et al. |
| 2014/0304068 A1* | 10/2014 | Weinblatt ........... G06Q 30/0248 705/14.47 |
| 2014/0329565 A1 | 11/2014 | Mannix et al. |
| 2015/0019307 A1 | 1/2015 | Girard et al. |
| 2015/0038120 A1 | 2/2015 | Larkin |
| 2015/0071427 A1 | 3/2015 | Kelley et al. |
| 2015/0073891 A1* | 3/2015 | Dauneria ........... G06Q 30/0246 705/14.44 |
| 2015/0149301 A1 | 5/2015 | Dow |
| 2015/0180733 A1 | 6/2015 | Krutzler et al. |

(56) References Cited

U.S. PATENT DOCUMENTS

| | | |
|---|---|---|
| 2015/0199699 A1 | 7/2015 | Milton |
| 2015/0201313 A1 | 7/2015 | Celik et al. |
| 2016/0021336 A1 | 1/2016 | Abbott |
| 2016/0063528 A1* | 3/2016 | Zhang ............ G06Q 30/0207 705/14.26 |
| 2016/0094721 A1 | 3/2016 | Tapia |
| 2018/0007198 A1 | 1/2018 | Rabra et al. |

FOREIGN PATENT DOCUMENTS

| | | |
|---|---|---|
| WO | 2012047273 A9 | 4/2012 |
| WO | WO2014/049322 | 4/2014 |

OTHER PUBLICATIONS

International Search Report and Written Opinion, dated Jun. 3, 2016, International Application No. PCT/US2016/013112, filed Jan. 12, 2016., 15 pages.

International Search Report and Written Opinion, dated Aug. 11, 2016, International Application No. PCT/US2016/30634, filed May 4, 2016, 15 pages.

International Search Report and Written Opinion, dated Aug. 11, 2016, International Application No. PCT/US2016/30664, filed May 4, 2016, 15 pages.

International Search Report and Written Opinion, dated Aug. 12, 2016, International Application No. PCT/US2016/30612, filed May 3, 2016, 19 pages.

International Search Report and Written Opinion, dated Aug. 12, 2016, International Application No. PCT/US2016/30699, filed May 4, 2016, 15 pages.

International Search Report and Written Opinion, dated Sep. 16, 2016, International Application No. PCT/US2016/30764, filed May 4, 2016, 13 pages.

International Search Report and Written Opinion, dated Aug. 18, 2016, International Application No. PCT/US2016/30859, filed May 4, 2016, 12 pages.

International Search Report and Written Opinion, dated Jul. 25, 2016, International Application No. PCT/US2016/21540, filed Mar. 9, 2016, 17 pages.

* cited by examiner

INTERACTIVE CAMPAIGN-BASED CUSTOMER FEEDBACK COLLECTION PLATFORM

CROSS-REFERENCE TO RELATED APPLICATIONS

This application is a continuation application of co-pending U.S. application Ser. No. 15/888,379, now U.S. Pat. No. 10,147,106, filed Feb. 5, 2018, which application is a continuation of U.S. application Ser. No. 15/146,597, now U.S. Pat. No. 9,906,653, filed May 4, 2016, which application claims priority to U.S. Provisional Patent Application No. 62/156,723, filed May 4, 2015. The entire contents of those applications are incorporated herein by reference.

BACKGROUND

Mobile Network Operators (MNOs) continually seek new and simple ways to reach their customers and inform them of exciting promotional offers, new pricing plans, discounts, and new service offerings. While there is a myriad of channels to reach subscribers, most are highly ineffective. Commonly, people refuse to provide an email address linked to their mobile account, or simply ignore email promotions sent from the mobile operators. Often, email and paper mailed notifications are not read and are viewed as spam or junk mail by customers. In many markets, particularly emerging markets, mobile subscribers have limited access to the Internet and do not visit a mobile operator's website.

In markets that allow it, one of the most effective ways to reach customers is through a Short Message Service (SMS) channel. Offers are sent by mobile operators or third parties to mobile subscribers via SMS, and subscribers can typically reply with a special code to opt-in to an offer or new service promotion. This requires the user to view the SMS, and to understand the instructions on how to sign up for the offer. In many cases, offers are received by subscribers and are delivered to their SMS inbox on their mobile phone, and the subscriber does not see the offer until it has expired. In other instances, subscribers will delete the SMS offer without even reading it, similar to deleting emails or throwing away paper mailings. When subscribers do view an offer, traditionally many of them who wish to sign up for the promotion do not fully understand the instructions for the reply prompt, and do not provide the proper reply credentials for the offer; hence, never opting in to the new promotion. A simple, single-click, highly interactive marketing solution able to target a wide range of mobile subscribers at once is needed in the industry.

SUMMARY

One aspect of this disclosure provides a computer-implemented method for automatically prompting a user to respond to an offer on a mobile device after a triggering event. The method comprises: receiving, at a server, an indication that a triggering event has occurred; receiving, at the server, an indication that the triggering event matches a triggering event stored in a database operably connected to the server; receiving, at the server, a communication comprising the Mobile Station International Subscriber Directory Number (MSISDN) of the mobile device; preparing a first offer message comprising one or more first actionable response options; and sending the first offer message to the mobile device.

In some embodiments, the method further comprises comparing the MSISDN of the mobile device to MSISDNs associated with an offer campaign and stored in a database operably connected to the server. In further embodiments, the method comprises comparing the MSISDN of the mobile device to an opt-out list stored in a database operably connected to the server, wherein the opt-out list comprises one or more MSISDNs for one or more mobile devices that have opted out of receiving offer messages. In additional embodiments, the method also comprises comparing the MSISDN to a blacklist stored in a database operably connected to the server, wherein the blacklist comprises one or more MSISDNs that a Mobile Network Operator desires to prevent from receiving offer messages. In still further embodiments, the method additionally comprises: receiving, at the server, device type of the mobile device; and comparing the device type of the mobile device to a banned list stored on a database operably connected to the server, wherein the banned list comprises one or more device types that should not receive offer messages. In yet further embodiments, the method also comprises: determining whether previous offer messages have been sent to the mobile device; counting how many previous offer messages have been sent to the mobile device if offer messages have been sent to the mobile device; and comparing the number of offer messages sent to the mobile device to a limit amount, wherein an offer message is not sent to the mobile device if the number of offer messages sent to the mobile device is greater than or equal to the limit amount.

In some embodiments, the method also comprises receiving, at the server, a communication comprising actionable response option selected on the mobile device; and logging the actionable response option selected on the mobile device and the MSISDN of the mobile device. In further embodiments, the method additionally comprises determining whether the actionable response option selected on the mobile device was positive; sending a sign-up message to a Mobile Network Operator comprising the MSISDN of the mobile device, a campaign code, and, optionally, the date and time, wherein the sign-up message is sent when the actionable response option selected on the mobile device was positive. In certain embodiments, the sign-up message further comprises a short code.

In some embodiments, the method also comprises sending a follow-up message to the mobile device, the follow-up message comprising one or more of a confirmation message and a thank you message.

In some embodiments, the method also comprises updating a counter database with the positive or negative response, wherein the counter database counts the positive and negative responses received from a plurality of mobile devices.

In some embodiments, the method further comprises receiving, at the server, a non-responsive communication from the mobile device; preparing a second offer message comprising one or more second actionable response options; and sending the second offer message to the mobile device, wherein a non-responsive communication from the device indicates at least one of the following occurred on the mobile device: no first actionable response option was selected on the device, the first offer message disappeared from the screen after a timeout setting was met, the mobile device was unable to display the offer message, and an unknown error occurred on the mobile device.

In certain embodiments, the method additionally comprises updating a offer message counter database, wherein the number of offer messages sent to the MSISDN associated with the mobile device is increased by one.

In some embodiments, the triggering event is selected from the group consisting of the mobile device having used up a first amount of a data plan, the mobile device having used up a second amount of a voice plan, the mobile device having used up a third amount of an SMS plan, the mobile device having used up a fourth amount of an MMS plan, when a browser on the mobile device navigates to a first web address, when the location of the mobile device is within a first geographic area, when the account balance associated with the mobile device falls below a threshold amount, and after a certain number of phone calls.

Another aspect of this disclosure provides a computer-implemented method for automatically prompting a user to respond to an offer on a mobile device after a triggering event, the method comprising: receiving, at the processor in the mobile phone, an indication that a triggering event has occurred; receiving at the mobile device a first offer message comprising one or more first actionable response options; and displaying on the screen of the mobile device the first survey message. In some embodiments, the method also comprises playing an alert tone on the mobile device when the first offer message is displayed.

In some embodiments, the method further comprises launching an application installed on the mobile device, wherein the application causes the first offer message to be displayed. In some embodiments, the application is installed on the SIM card of the mobile device. In other embodiments, the application is installed on the operating system of the mobile device.

In some embodiments of the method, the first offer message further comprises an Integrated Circuit Card Identifier (ICCID). In some embodiments, the method further comprises: comparing the ICCID of the first offer message to the ICCID of the mobile device, wherein a match indicates that further processing of the first offer message is permissible. This comparison allows for an additional security step in the method.

In other embodiments, the method further comprises determining whether the mobile device can execute instructions contained in the first offer message. In some embodiments, the method also comprises determining whether the mobile device is roaming.

In some embodiments, the method also comprises receiving, in the application, the first actionable response option selected by the user. In some embodiments, the method further comprises sending a communication comprising the first actionable response option selected by the user to a server.

In some embodiments, the first offer message further comprises first executable instructions. In some embodiments the executable instructions can be executed by the processor of the mobile phone. In some embodiments, the executable instructions can be executed by the application. In some embodiments, the method further comprises executing, by the application, the first executable instructions, wherein the executable instructions comprises instructions for one of calling a phone number, opening a browser and navigating to a web address, or displaying a message on the screen of the mobile device.

In some embodiments, the method also comprises receiving, in the application, a non-responsive response. In certain embodiments, the non-responsive response indicates that the first option message had been removed from the screen of the mobile device because of a timeout.

In some embodiments, the method additionally comprises determining the display count, wherein the display count represents the number of times the first offer message has been displayed on the screen of the mobile device; comparing the display count to a display count limit; and sending a limit communication to the server, wherein the limit communication is sent when the display count is greater than or equal to the display count limit. In certain embodiments, the method also comprises displaying the first offer message on the screen of the device again.

In some embodiments, the triggering event is selected from the group consisting of the mobile device having used up a first amount of a data plan, the mobile device having used up a second amount of a voice plan, the mobile device having used up a third amount of an SMS plan, the mobile device having used up a fourth amount of an MMS plan, when a browser on the mobile device navigates to a first web address, when the location of the mobile device is within a first geographic area, when the account balance associated with the mobile device falls below a threshold amount, and after a certain number of phone calls.

Yet another aspect of this disclosure provides a computer-implemented method for verifying an account log-in on a mobile device, the method comprising: receiving, at a server, a request to authenticate a log-in request from a third party, the request comprising the MSISDN of the mobile device; preparing an authentication message comprising one or more actionable response options; sending the authentication message to the mobile device associated with the MSISDN; receiving a first response message comprising an actionable response option selected on the mobile device; and sending a second response message comprising the actionable response option selected on the mobile device to the third party. In some embodiments, the first response message further comprises a second MSISDN.

In some embodiments, the method also comprises comparing the second MSISDN to the MSISDN of the mobile device, wherein the second response message indicates the log-in is verified if the second MSISDN is the same as the MSISDN of the mobile device. In some embodiments, the third party is a financial institution.

DETAILED DESCRIPTION

Figure 1:
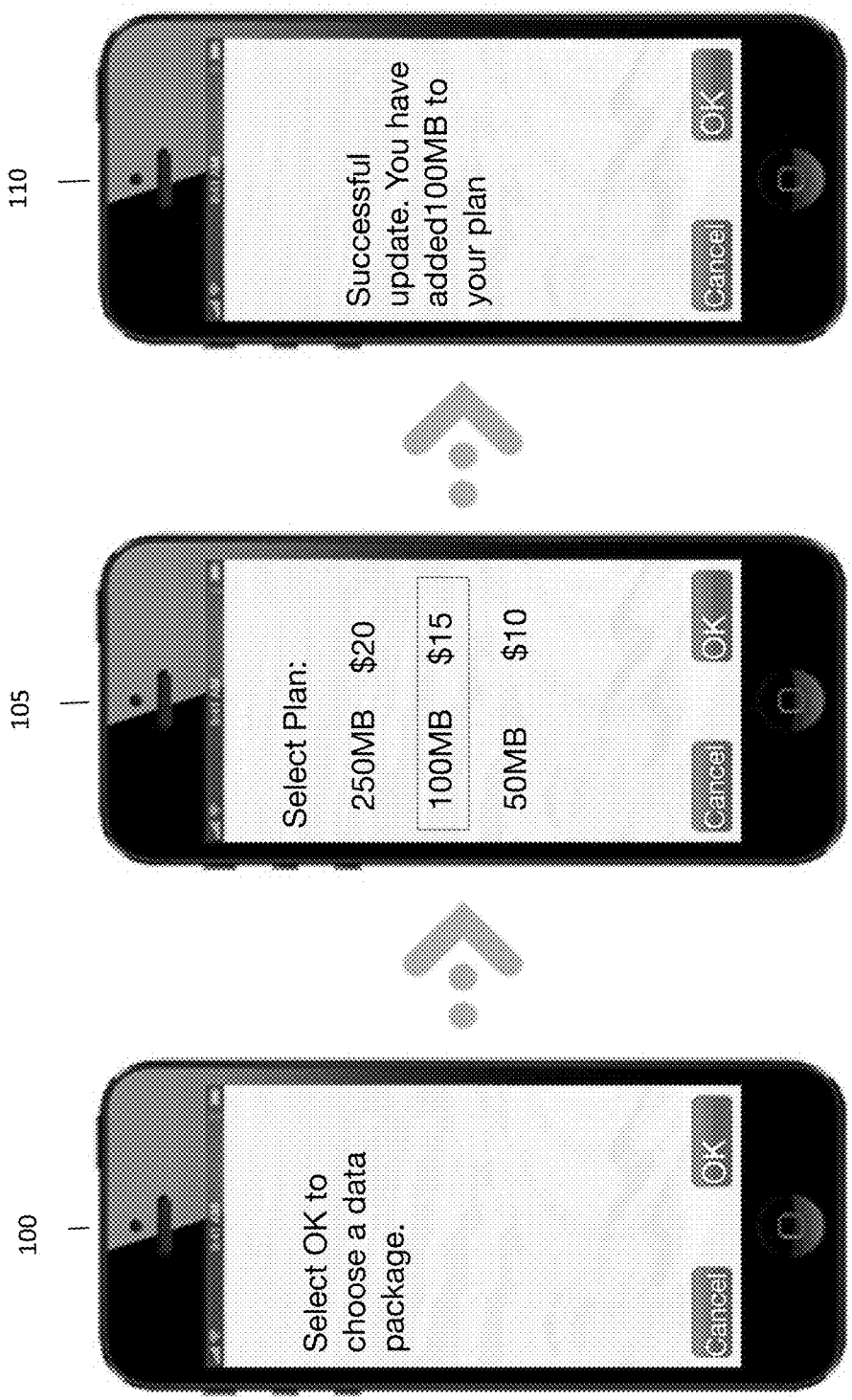
FIG. 1 is an illustration of exemplary stages of a graphical user interface that a user may encounter when using an embodiment of BoosterX.

This application provides aspects and embodiments of OnePIN's BoosterX™ service. The term "BoosterX" is used throughout this application to refer to multiple aspects and embodiments of the methods, applications, services, systems, and platforms disclosed herein. The name "BoosterX" is not limited to any specific embodiment and can refer to multiple embodiments or individual embodiments. Furthermore, other names are also used to refer to embodiments described herein.

As used herein, the terms "a" and "an" mean one or more than one.

In some aspects, BoosterX is a cloud based platform that interacts with a client application residing on a mobile phone—either as a downloadable application from an external site, within the device OS or within a SIM card. In some aspects, BoosterX is a campaign based marketing service that enables mobile operators to promote new services, pricing promotions, or other events to their subscribers.

In some embodiments, subscribers (the terms "subscriber" and "mobile user" are used interchangeably in this disclosure) can easily upgrade their voice, SMS, MMS or data package using a simple, interactive user interface prior to their plans expiring. They can also opt-in to new promotions that may be beneficial for them. MNOs increase their revenue by upgrading subscribers to higher capacity data plans and by eliminating downtime between data plan refills. Revenues are also earned when operators are able to offer new services or pricing packages to the existing subscriber base via BoosterX, and subscribers opt-in to the promotions. In some embodiments, mobile users are never charged directly for the BoosterX application or service. Subscribers pay only for the voice, data, SMS, or other promotions offered by the operator or third party.

With the BoosterX service, MNOs can increase monthly upgrades to larger data plans with a simple user interface. This particular feature is highly flexible, and the MNO can provide the user with multiple choices that are fully customizable based on the particular scenario.

In some embodiments, the BoosterX service available to MNOs is fully customizable. It can be customized any way the MNO or third party wishes. MNOs can easily define their own campaigns and their own promotional pricing. In some embodiments, communications happen via an API (Application Programming Interface), so the BoosterX service is always synchronized with the MNOs current pricing schemes for all plans.

The BoosterX platform can also be utilized for SMS packages, general top-ups, voice plans, or any other service or new promotions the MNO chooses to offer. BoosterX can be used for any billing related upsell or for general marketing and awareness campaigns. MNOs may choose to focus on offering data package promotions, because increasing data revenues is usually a priority within most MNOs' strategies. MNOs make higher margins on the unused data package portions compared to unused portions of SMS and/or voice bundles. Moving people to a higher capacity data plan is a big advantage for the MNO.

In some scenarios, MNOs or administrators of the BoosterX platform can determine a trigger point that will launch a campaign to a group of subscribers or to an individual subscriber. This is the point at which the MNO would like to remind a subscriber that he or she is near their allowable plan billing limit by sending a communication to the subscriber. For example, if a subscriber is nearing the end of his allowable data limit, the subscriber's MSISDN is automatically provided to the BoosterX server via an API, along with the subscriber's current data plan and the amount of data already utilized. Also sent with each communication are the current data plan options available to the subscriber and the associated pricing for each data plan. The BoosterX platform will then automatically run a campaign to the subscriber letting the subscriber know that he is near the end of his plan, and offering new "top-up" options to the subscriber.

In some embodiments, BoosterX platform includes a web interface that enables businesses, enterprises, marketers, etc. to log in and define which services they would like specific subscriber groups to see. This interface also allows administrators to create a "campaign." Within the campaign event, businesses or mobile operators enter relevant information including, but not limited to, the target phone number(s) and the timeframe during which a campaign will be relevant. The user interface specifics (i.e., the text mobile consumers will see) can be entered via the web interface. MNOs are also able to specify the maximum number of subscribers that should be targeted in a single day, and the length of time (days or hours) the campaign should be executed.

In some embodiments, a link between a server ("cloud" or "cloud platform") and the MNO's network is established. There can be multiple links from various systems within the MNO network to the BoosterX server. For instance, the BoosterX platform may receive notifications via web services or an API or other means from the MNO's billing platform, the switch, a subscriber database, or other customer data warehouse or information platform. When the BoosterX platform receives communications via the API, the platform checks the phone number to determine if the subscriber has opted out from receiving promotions. The opt out process is explained in further detail below. If the subscriber has opted out of the service, then processing ends and no further communications are sent to the subscriber.

If the subscriber is not on the opt-out list or on a blacklist (a blacklisted mobile device has mobile specifications that may be problematic to receive these campaigns), then an appropriate campaign message is prepared based on the configuration criteria and sent to the mobile subscriber. Here, this communication is described as an SMS that triggers a remote application on the calling party's mobile phone. This could be a binary SMS, standard text SMS, a specialized (flash, class 1) SMS, or a class 2 SMS which the handset passes to a SIM card within the device. Alternatively, communications can occur via MMS, email, USSD, or via other web-based communications channels between the mobile phone and the BoosterX platform. The message contains actionable response options.

When the message is received on the subscriber's mobile device, the client application displays the prompt the caller. For example, the message displayed on the mobile device could read:

---

You have used 90% of your allowable data limit for this month. To avoid costly overage charges, upgrade your data plan now. Select from the following:

10 MB - $15
50 MB - $25
100 MB - $40
500 MB - $60

---

The user is able to navigate through the menu and select a response, which is then sent back to the BoosterX server via the application. Communication back to the server can be via a data channel, SMS, MMS, or USSD communication.

The remote client application can be configured to receive communications from the platform indicating where a response from a mobile user should be sent. In one embodiment, a command message sent to the client application may indicate that all user responses should be sent to a specific SMS shortcode. In an alternative embodiment, the platform can send a command message that indicates that only positive responses from a targeted user should be sent to a designated address, and all other responses from the remote client should be sent to a different address. This functionality within the platform and client grants the Mobile Network Operator pricing and billing flexibility. The MNO is able to charge users for specific actions taken when the promotions are displayed to the user.

USSD (Unstructured Supplementary Service Data)

The above embodiments can also be implemented in a manner where a client application (either on the phone or on the SIM card) is not required. In this instance, a USSD channel is opened and the communications between the mobile subscriber and the BoosterX platform occur via USSD communications.

The cloud server can have the intelligence to communicate with one or more of the client applications. The cloud server can collect the device type of the respective mobile devices (also referred to as the TAC or Type Allocation Code) and can send a message to the respective client applications to "turn off" the BoosterX client application in mobile devices that have known issues and/or bugs that interfere with the service.

Opt-Out Process

Each time the subscriber receives a message from the BoosterX server, he or she has the option not to reply. The BoosterX service has the intelligence to count the number of rejections, or message timeouts (i.e., no user response was received after a specified amount of time) and, based thereon, can ask the subscriber if he or she would like to opt-out from receiving future promotions. The opt-out counters for the subscribers who have used the service and for the subscribers who have never used the service can be different. For example, if the mobile subscriber (calling party) has never replied to any promotional prompts, an opt-out screen can be displayed for a set number of times he has canceled out of the prompting screen. For example, a counter can be set at "3" (after 3 (three) times he chooses not send a reply to the prompt question; he will be shown a screen to opt-out of the service). If the mobile subscriber has responded to a promotional prompt in the past, but has recently cancelled out of several prompt offers, this opt-out counter can be set higher—for example to 6 (six), as this user has exhibited past behavior indicating that he or she is willing to respond to promotional prompts for specific offerings. In some embodiments, the counter can be set to a percentage of declines or opt out responses out of a specific number of offer messages sent and/or over a specific time period.

BoosterX is preferably used with a mobile phone, but can also be used with other devices that can be configured to receive text SMS or MMS messages. For example, tablets, watches (such as the Apple watch), and other computers can be utilized with the service.

AuthenXicator

In another embodiment, the BoosterX platform may be triggered and a communication generated and sent to a user based on outside event that was not initiated from the mobile device. For example, the BoosterX service could be used as part of an authentication mechanism for banks or other entities wanting to provide another level of encryption and protection when customers are signing on to an online account from a mobile or computer device. In this scenario, when a customer first opens up a bank account, or first decides to access his account online via a web portal, he is asked to enter his mobile phone number. An SMS is sent to his mobile phone, asking him to confirm that he does in fact own the mobile number provided. The next time the subscriber chooses to log into his account from a public portal or from a connected device, a communication between his device, the bank, and the mobile operator occurs. In one embodiment, this communication between the customer and the bank is via a simple secure internet connection or webservices. Communications between the bank and the mobile operator could happen via application programming interfaces, webservices, or other automatic computing means. When the mobile operator receives a communication from the bank, an automatic communication to the BoosterX server occurs via another application programming interface or webservice. In this communication, the customer's mobile phone number is passed to the BoosterX server. The BoosterX platform then automatically prepares a message campaign to the application residing at the customer's mobile device or SIM card. The application is triggered and the following question is prompted at the screen: "Please confirm that you want to log-in to your bank account". If the subscriber confirms by selecting an actionable response option, e.g., by choosing "Yes" or "OK" or "Accept" or a similar option, then the application re-assembles the response in a message format and sends it back to the BoosterX server. The server assembles the originating address (customer's mobile number), and responds to the bank's server with the customer's mobile number and the chosen response "Yes" [or "No" in case the response is negative].

Using the BoosterX Platform to Support the CallConneXion Service

In yet another embodiment, the BoosterX platform can be initiated by an intelligent inbound calling campaign. In one embodiment, the inbound calling campaign capability is referred to as the CallConneXion™ service. Used in this fashion, the platform allows brands and mobile operators to intelligently target and connect with large groups of consumers who have already shown an interest in a given promotion. MNOs or brands identify a target list of consumers. Each target consumer has an associated MSISDN. The platform launches a campaign, sending a command message to each targeted consumer. The consumer will see the promotion message on his device. In one exemplary scenario, the consumer may see a promotion such as:

Interested in learning how to get an iPhone 6 for only $1/month? Press OK to chat with a Sprint customer service representative, and we'll tell you more! Free call!

When the consumer selects accepts, e.g., by selecting "OK" or "Accept" or a similar actionable response option, the BoosterX client application on the device automatically calls a predefined number on behalf of the subscriber. Any phone number can be dialed including a fixed line phone number, any national number, or any international number. The phone number that will be dialed on behalf of the subscriber is defined at the platform level when the campaign is configured. In some embodiments, the phone number is sent as part of the command message which the remote client application interprets. The subscriber does not need to type any digits or know any codes. The call is placed automatically after the user accepts a promotional prompt.

Campaign Protocol

In some embodiments, Mobile Terminated (MT) messages sent to the remote client application utilize a specialized protocol. This is defined by a specific byte array. In one embodiment, byte 0 defines the message type. Byte 1 is a message sub-type with bits designating if 1.) a playtone event on the client side should occur upon reception of the proactive command request, 2.) roaming detection should be enabled or disabled and 3.) various short code addresses should be configured such that the application is able to send responses back to billable or non-billable rated short codes as the business logic requires. Roaming detection is a function where the application is able to determine if a subscriber is out of their home country or home location. In an instance where the mobile device is roaming, the application can be configured to remain silent when a proactive command message is received from the platform. In this way, the application will not display messages to the user thereby potentially creating unwanted billing charges while the user is traveling outside their home network.

In some embodiments, the byte array also includes the ICCID (Integrated Circuit Card Identifier) of the intended target SIM card as an added security mechanism. The application can be configured to check the ICCID of all incoming messages with the actual ICCID on the card to ensure there is a match. The proprietary messaging protocol also allows for a unique ID to be set such that each response sent back to the server obtains a matching unique ID at the platform level. Optional Action IDs can also be set which can be linked to custom code within the remote application. The number of times a proactive command should be executed or "retried" can also be defined in the situation where no response is received from the user. In some embodiments, a Terminal Profile check is also included, which allows the remote client application to test if the terminal device supports the requested proactive command. The proactive command details, per the GSM 11.14 standard are also defined within the message protocol.

In some embodiments, the Mobile Originated (MO) proactive session response is also defined by a specialized proprietary protocol. The message type and sub-type are defined within the protocol. Similar to the MT message protocol, a unique ID and an action ID can be configured. Finally, the terminal response is defined which allows the platform to decipher whether or not a response was received from the user, or if the session timed out, or if the device could not support the command.

Benefits of BoosterX Service

The following are some of the benefits of the BoosterX platform.

Simplicity: Establishing campaigns is a simple and straightforward process for mobile operators, businesses, or for third parties using the BoosterX platform. MNOs can easily configure campaigns and collect customer inputs in a very simple fashion without needing to employ an outside marketing firm, sales agents, or other resources.

Immediacy: Businesses and enterprises receive valuable customer feedback very promptly. The feedback loop time is shortened, enabling MNOs and businesses to modify future offerings very quickly, and tailor offers and promotions based on customer interest levels.

Customization: MNOs can easily tailor their campaigns for many different market segments. They are able to collect a wide range of customer interest levels for various promotions across many different market segments.

Wide Reach: Enterprises are able to easily target a large group of subscribers with a single quick campaign. Especially in developing areas, this is key as many survey participants may not have access to a computer or landline phone or physical store location (i.e., typical ways in which customer feedback is traditionally collected). However, these customers do have mobile phones, and can be valuable participants in the feedback process.

High Value: Billing models can be structured such that third party businesses only have to pay for actual responses received from mobile subscribers.

Revenue Generating Service: Mobile Network Operators (MNOs) are able to offer a differentiating service to their Business and Enterprise customers. Enterprises pay for valuable customer inputs and feedback, creating a significant revenue generator for MNOs, as each customer survey response represents a billed event.

Interoperable: The BoosterX platform works on all handsets, regardless of operating system or device type.

Interactive: There is no need for end users to manually send an SMS, or MMS, or email response, or to remember a complex USSD string. BoosterX utilizes an interactive one-click user interface that is automatically presented to the subscriber. The ease of use translates to higher response rates from subscribers who have the application on their phone, compared to other common promotional techniques used in the market.

High Opt-in: The ease of use translates to above industry average opt-in to promotions.

Relevant: Promotions can be timed to appear at relevant times, such as when a subscriber is almost out of balance or after a phone call when a subscriber is likely to be looking at his phone. Promotions can also be targeted to subscribers who have recently completed a top-up, meaning they have added funds to their account and have money available to spend on other new services.

Platform Operation

FIG. 1 exemplifies the interface a mobile user would interact with when using the BoosterX application to top-up his or her voice, SMS, MMS, or data package. In stage 100, after a triggering event, campaign, or promotional offer designed by the Mobile Network Operator (MNO), the device user sees a screen that asks the user if he/she would like to see promotional options (in FIG. 1, data packages) and includes actionable response options for the user to select.

In the embodiment in which a user chooses to look over the offers, he or she is directed to a screen, exemplified by stage 105, in which the different options for promotions or a top-up are laid out in a simple interface in which each plan is paired horizontally with its price (in FIG. 1, data plan options). At this point, should the user still desire to proceed with a promotion or top-up he or she would select the option that they prefer and click "OK." Alternatively, in some embodiments, the user can select the option they prefer by tapping the option (without also having to click "OK").

In an embodiment where the mobile device user has selected the option he or she prefers, he or she is shown a final screen, exemplified by stage 110, in which the plan selection and payment is confirmed. A link to the MNO website or a thank you may also be provided to increase user interaction.

Figure 2:
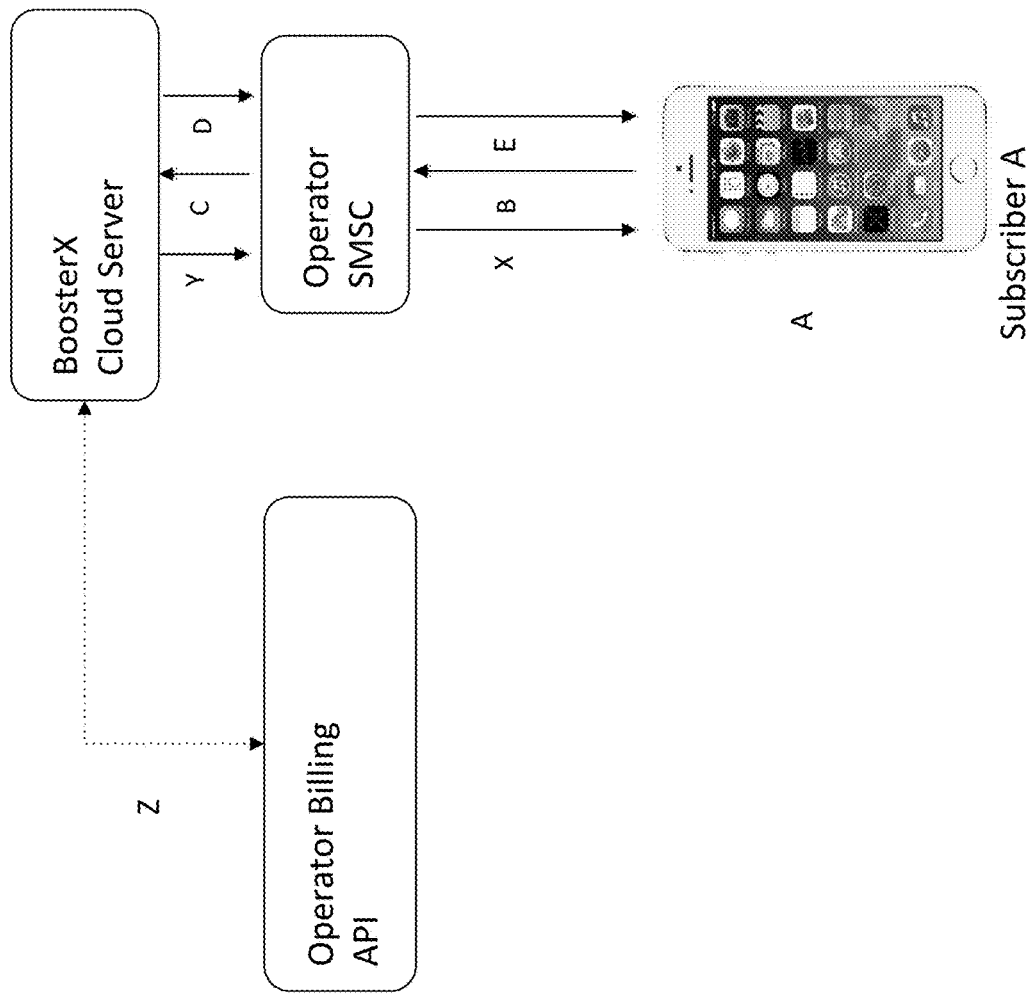
FIG. 2 is a flowchart illustrating exemplary architecture of the BoosterX platform.

In one embodiment, as illustrated by FIG. 2, BoosterX utilizes the following connectivity structure:

The Operator Billing Application Program Interface (API), Customer Relationship Management (CRM), and Customer Billing Management (CBM) are also in communication with the BoosterX Cloud Server (Z), this allows for the Operator Billing API to notify the MNO's CRM or CBM about the subscriber's usage of a prepaid plan or an account credit.

In various embodiments, the MNO notifies the BoosterX Cloud Server when Subscriber A: (1) reaches 95% of data use so that a top-up questionnaire is triggered to be sent, or (2) when he or she passes through a radius linked to the MNO's storefront geographic locations, or (3) when the subscriber's account balance is running low, or (4) near the end of the month or quota system that the subscriber may utilize as a regular plan, or (5) after a pre-set number of events (e.g. after 5 calls), or (6) when the subscriber visits the MNO's web page via his or her phone browser. The foregoing are examples of when the MNO may contact the BoosterX Cloud Server about Subscriber A. A person of ordinary skill in the art would understand that these examples are not limiting and that many other triggering events could be used to cause the MNO to contact the BoosterX Cloud Server. These additional examples understood by a person of ordinary skill in the art are encompassed by this disclosure.

In some embodiments, the BoosterX Cloud Server may initiate a process disclosed herein as it interacts with and receives responses from the subscriber. Depending upon the actions of the subscriber (participating with affirmative or negative responses, or not participating), the BoosterX Cloud Server also communicates the subscriber's responses to the Operator Billing API, CRM, and CBM.

In an embodiment that a user has opted in to receive promotions or trigger top-up plans (for example, when Subscriber A has reached 95% of his or her data use) the Operator Billing API triggers the sending of a top-up questionnaire or promotion to Subscriber A. This is communicated to the BoosterX Cloud Server which forwards the questionnaire on to the Operator SMSC in the form of a binary SMS message (Y).

The Operator SMSC forwards the top-up questionnaire or promotion to Subscriber A's device (X).

The questionnaire or promotion appears on Subscriber A's device as exemplified in FIG. 1 (A), at which point the subscriber selects his or her preferred option.

The BoosterX application within Subscriber A's mobile device forwards the top-up questionnaire answers (A) to a designated short code at the Operator SMSC (B).

The Operator SMSC receives and forwards the questionnaire answers to the BoosterX Cloud Server in the form of a binary SMS message (C).

The BoosterX Cloud Server parses and communicates the user response to the Operator Billing API, where user data plans can be updated. These updates would be communicated to the BoosterX Cloud Server (D).

Updated plans would be forwarded to the Operator SMSC via binary SMS message (E).

The Operator SMSC forwards the plan updates to the device user who is informed of the successful update via a confirmation display (see FIG. 1)(F).

Figure 3:
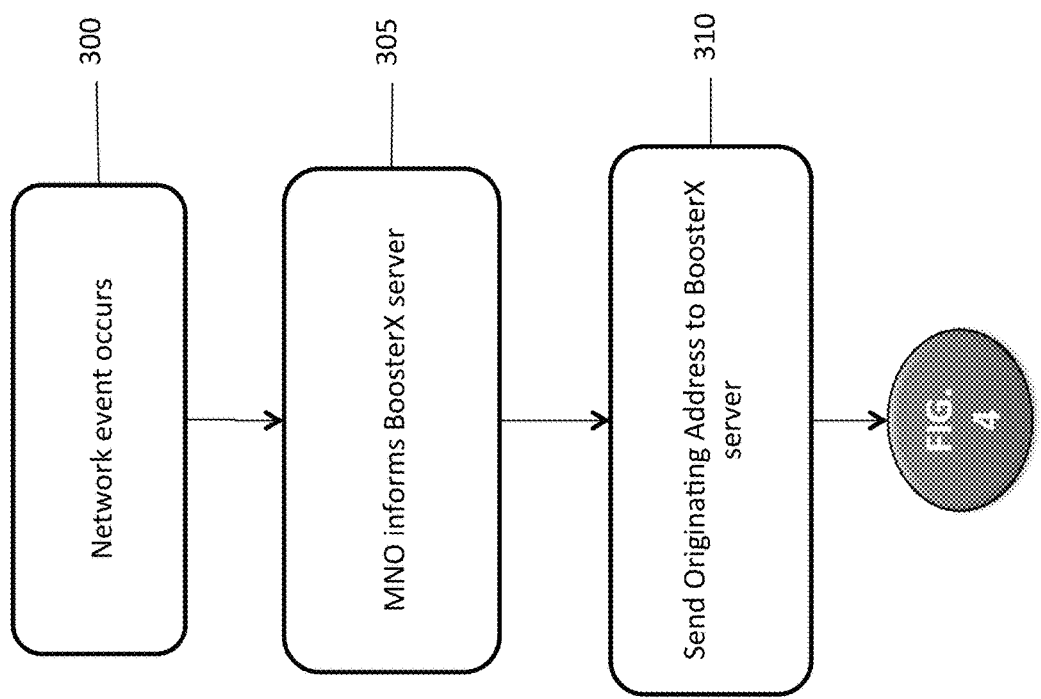
FIG. 3 is a flowchart illustrating exemplary interactions between the Mobile Operator Network and the BoosterX server platform.

FIG. 3 outlines a flowchart illustrating an exemplary embodiment of how the Mobile Operator network interacts with the BoosterX platform. In an embodiment exemplified by stage 300, a trigger event occurs. Triggers could include actions taken by the user, or events defined by the mobile operator. Examples could include: (1) The user tops up her data balance (i.e., she purchases more data), (2) The user has made X number of phone calls, (3) The user has just visited the MNO's webpage via her mobile phone, or (4) The user is about to run out of voice, SMS, or data balance for the month, or (5) The user is geographically near a storefront of the MNO through which she purchases her plan. A person of ordinary skill in the art understands that a number of other trigger events could cause the BoosterX platform to be activated. Such other trigger events are encompassed by this disclosure.

In one embodiment, when a trigger event occurs, the MNO automatically informs the BoosterX platform of the specific event via an API. The mobile subscriber's MSISDN, also known as the Originating Address, is forwarded to the BoosterX platform. The flow of information may also proceed through webservices or any other communication. This process is exemplified by stage 305.

In an embodiment exemplified by stage 310, the Originating Address is then sent to the BoosterX server platform.

Figure 4:
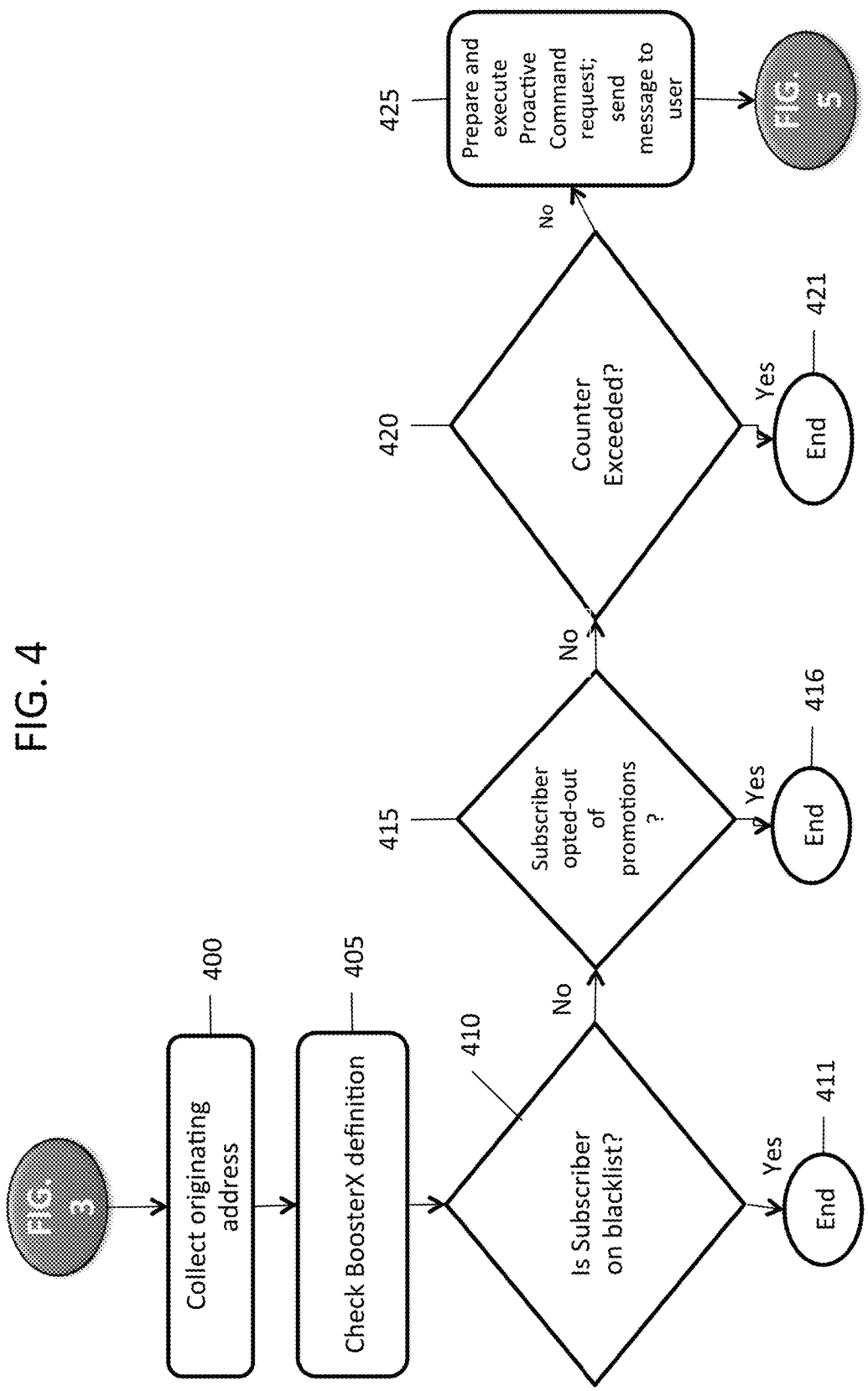
FIG. 4 is a flowchart illustrating the exemplary logic process that the BoosterX platform uses to determine if a campaign message should be sent to a specific targeted mobile subscriber.

FIG. 4 is a flowchart illustrating exemplary logic that the BoosterX platform uses to determine if a campaign message should be sent to a specific targeted mobile subscriber. In an embodiment exemplified by stage 400 the BoosterX platform collects the originating address (the mobile subscriber's MSISDN) from the MNO via an API, webservice, or other communication (stage 310 in FIG. 3). At stage 405, the BoosterX platform checks the BoosterX campaign definition for the subscriber's MSISDN. In some embodiments, the platform runs through a series of optional checks to determine if the mobile subscriber should be targeted with a BoosterX campaign message. At stage 410, the BoosterX platform determines if the mobile subscriber is on a blacklist. A blacklist could be defined by the Mobile Network Operator, and could include a group of subscribers the MNO does not wish to have targeted. In other embodiments, a specific device type could be blacklisted. Blacklisted devices could be mobile terminals that do not conform to standards or GSM specifications or simply those which present a poor user experience. Mobile subscribers with a blacklisted device would not be further targeted with a campaign, as outlined in stage 411.

At stage 415, the platform can next check to determine if the subscriber has opted out of receiving promotions. If the subscriber has indicated she does not wish to receive notifications, processing ends as noted in stage 416. Next, the platform can also check configurable counters at stage 420 to ensure the targeted subscriber has not received a number of messages that exceeds a total amount of message or a specified amount of messages over a specific time period. In an embodiment where any counter has been exceeded, the process of targeting the mobile subscriber for BoosterX communication ends, exemplified by stage 421.

In an embodiment where the user's counter has not been reached, the BoosterX platform prepares and executes a Proactive Command request and sends the mobile subscriber a message, exemplified by stage 425.

Figure 5:
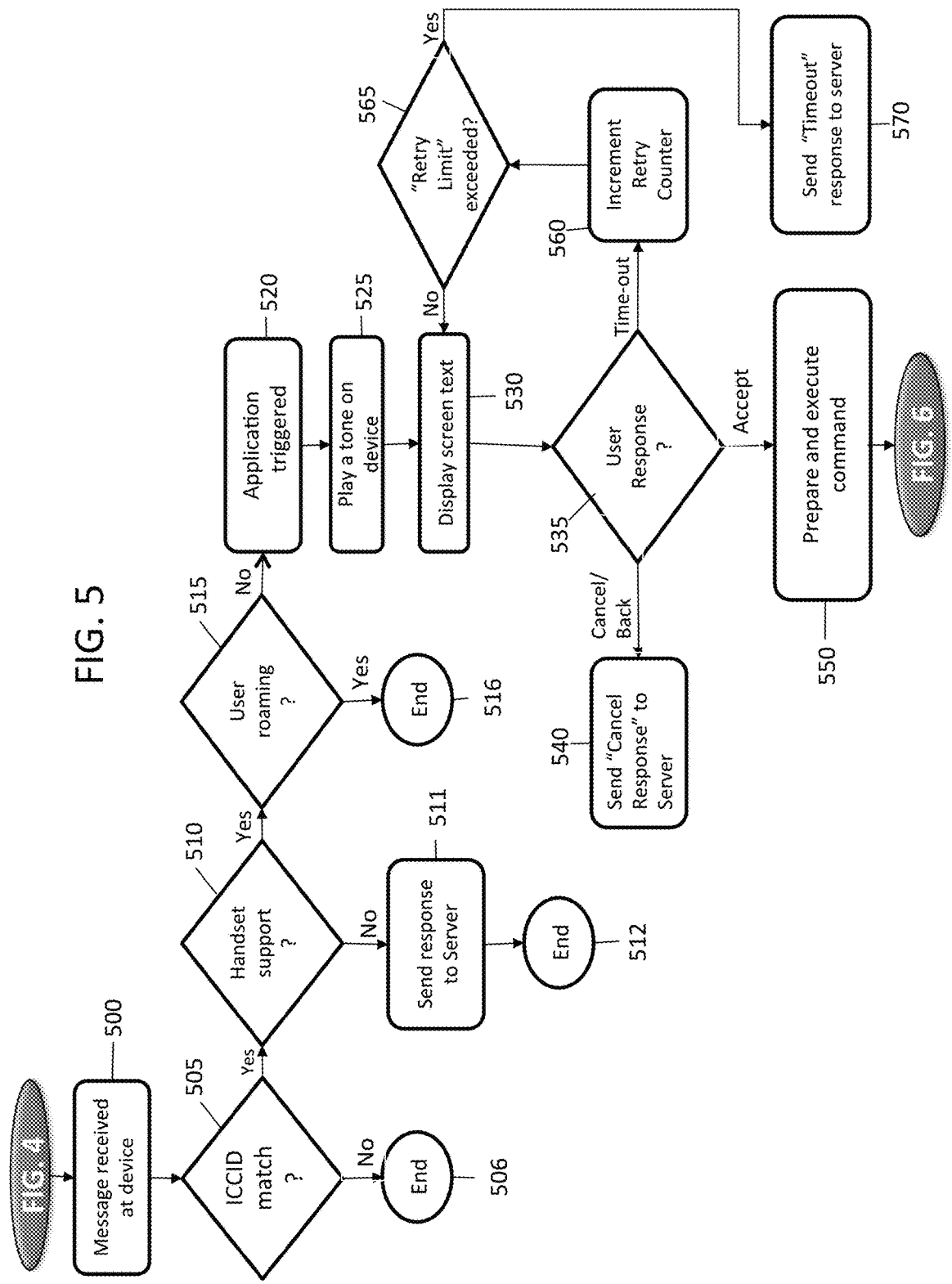
FIG. 5 is a flowchart illustrating an exemplary process of how the BoosterX application is expressed and interacts with the user device.

FIG. 5 outlines an exemplary embodiment of how the BoosterX application is expressed and interacts with the user device. This exemplary process illustrates an embodiment of the user experience.

At stage 500, a proactive command message is sent from the platform to the remote client application. The proactive session request ("message" in FIG. 5 at stage 500) is received at the device. At stage 505, the client application checks the ICCID (Integrated Circuit Card Identifier) within the command message sent from the server, and compares it to the ICCID reported by the SIM card in the device. This serves as an added security check. In the embodiment where the ICCID sent from the platform does not match the ICCID reported by the SIM card, the security check fails and processing ends, as exemplified by stage 506. If the ICCIDs match, the client application then checks if the command requested by the platform is supported by the device. This check, occurring at stage 510, determines if the handset device can execute the promotion as defined at the platform level (i.e., the handset supports execution of the command). If the device does not support the command, as exemplified at stage 511, a response message is sent back to the platform indicating "no device support." If the device reports that the command is supported, the client application will next check to determine if the mobile subscriber is roaming, as exemplified by stage 515. The client application can be configured to determine if the mobile user is roaming on another mobile operator's network, or is roaming out of the country, or is roaming out of their home network zone. The campaign can be configured to stop processing at stage 516 in the embodiment where a subscriber is reportedly roaming. These process steps and checks can be performed in multiple combinations and orders.

In the embodiment where a subscriber is not roaming, the client application triggers at stage 520. In some embodiments, the client application can be configured to play an alert tone to the user, as exemplified by stage 525. The client application will then proceed with the promotional campaign. This could involve launching a website, displaying screen text to a mobile user, or displaying a list of selectable items. Other embodiments and campaign scenarios are also possible. In one exemplary embodiment, the text of a campaign message is displayed on the screen is shown at stage 530. An exemplary message could read:

"Add more data to your plan! 10 MB for only $15—available today only! Select OK to add to your plan."

If the mobile user cancels or exits the promotional screen or selects a "No" option, a response is sent back to the platform at stage 540 indicating the user response. If the user provides a positive response at stage 535, the client application can prepare and execute another proactive command at stage 550, e.g., displaying another screen to the subscriber or automatically placing a phone call to a predefined number or launching a web site. In other embodiments, the user's "OK" selection may be sent back to the platform and processing on the client side is complete.

If the user does not provide a response, in some embodiments the proactive session may time-out (for example, the text displayed on the screen may disappear). In this embodiment, a retry counter is incremented at stage 560. The client application checks if the retry limit has been reached at stage 565. In the embodiment where the limit has not been reached, the client application re-issues the proactive command and the promotional screen is displayed again at stage 530. In the event the retry limit has been reached at stage 565, the client application sends a timeout response to the server at stage 570 which is logged at the server. This timeout response indicates that the subscriber did not interact with the BoosterX promotion in any way.

Figure 6:
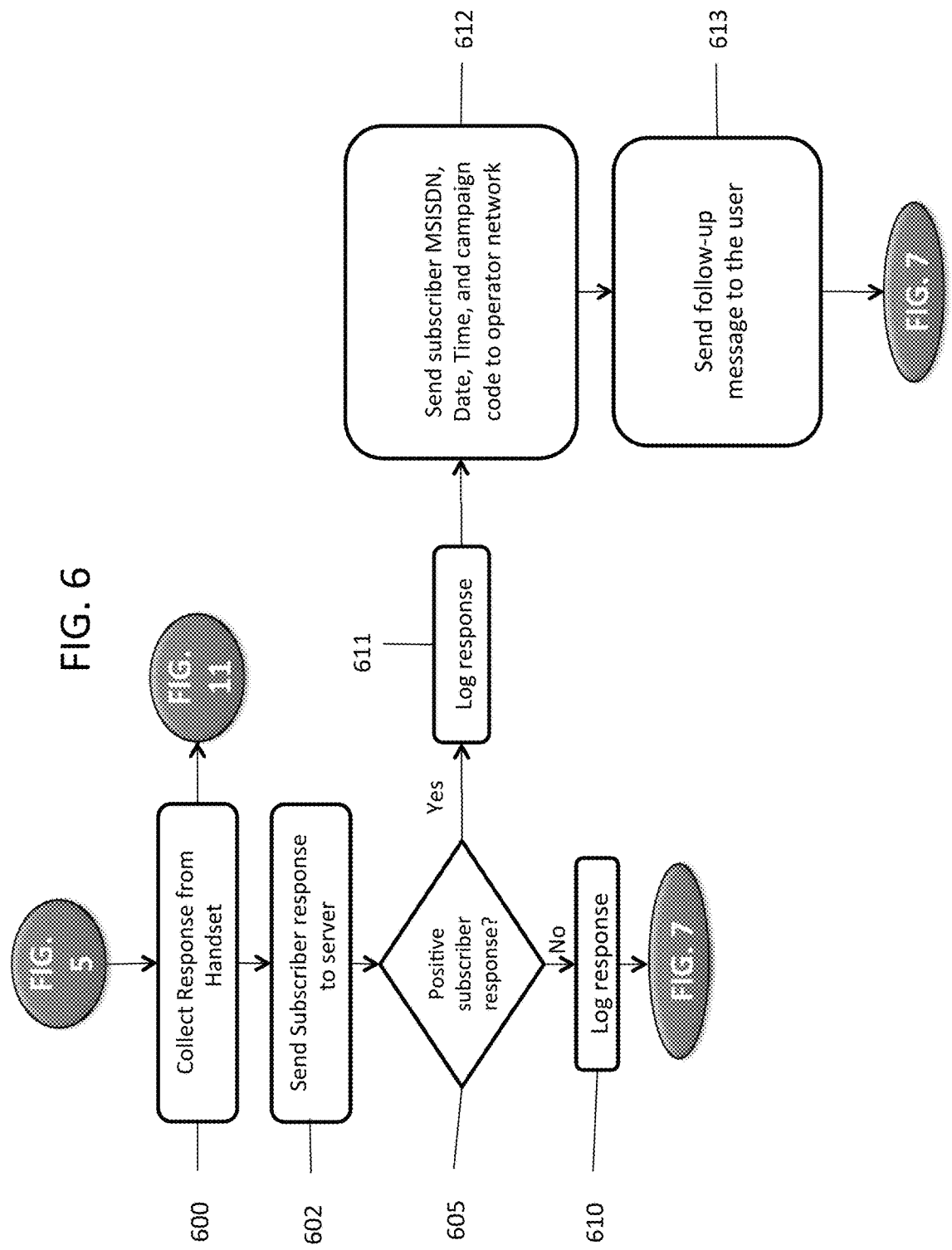
FIG. 6 is a flowchart illustrating an exemplary process of how the BoosterX platform logs the mobile device user's responses and communicates the responses to the MNO.

FIG. 6 is a flowchart illustrating an exemplary process of how the BoosterX platform logs the mobile device user's responses and communicates the responses to the MNO. In one embodiment, at stage 600, the client application processes the user's response to the promotion. At stage 602, the user's response to the BoosterX campaign query is sent from the client application to the BoosterX platform. The BoosterX platform reacts differently depending on the subscriber's response (stage 605). If the mobile user's response was not positive (i.e., she chose "No" or "Cancel" at stage 535) the BoosterX platform logs the response (exemplified by stage 610). From this point the platform proceeds to update the MNO. (See FIG. 7, stage 700 for example). In the embodiment where the user's response was positive (i.e., she chose "Yes" or "Accept" at stage 535) the BoosterX platform logs the response (at stage 611).

In an embodiment exemplified by stage 612, the BoosterX platform proceeds to send one or more of the user's MSISDN, Date, Time, and Campaign Code to the MNO via an API or via an SMS on the user's behalf to the MNO network to sign her up for the promotion.

In an optional embodiment exemplified by stage 613, a follow-up message may be sent to the user to confirm her participation in the promotion or to thank her (e.g., "Your 10 MB have been added to your plan! Thank you for choosing Vodafone."). From either stage 612 or 613 the BoosterX service proceeds to update the MNO. (See FIG. 7, stage 700).

Figure 7:
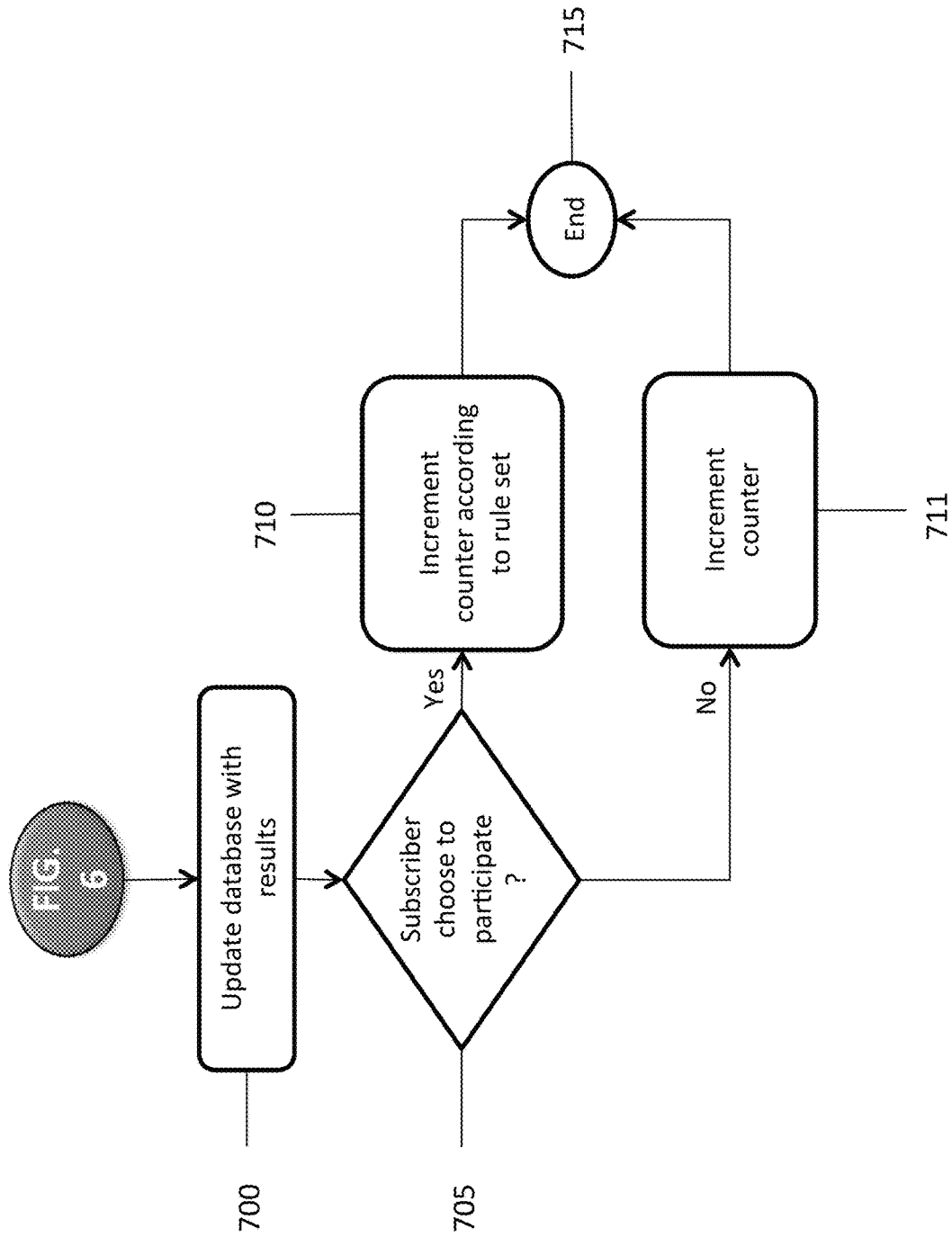
FIG. 7 is a flowchart illustrating an exemplary process of how the BoosterX platform updates the MNO database with subscriber participation, tracking the participation such that the MNO may modify the frequency of campaign offers or promotions depending on subscriber responsiveness.

FIG. 7 outlines the exemplary process of how the BoosterX platform updates the MNO with subscriber participation, tracking the participation such that the MNO may modify the frequency of campaign offers or promotions depending on subscriber responsiveness. The database supporting this process can reside within the BoosterX platform or within the MNO network. In an embodiment exemplified by stage 700, the BoosterX platform is updated with the user's response (see stages 610 or 612) to the BoosterX campaign query.

The BoosterX platform then analyzes whether or not the mobile subscriber chose to participate, exemplified in the stage 705 query. In the embodiment where the mobile subscriber chose to participate in the BoosterX campaign, the BoosterX platform proceeds according to the rule set previously for the increment counter (e.g., "Do not trigger/do not send again if the MNO only wants one response per MSISDN" or some similar rule).

In one embodiment, at stage 715, the BoosterX service is complete and ends when the user has participated in the campaign and the increment counter has responded according to previously set rules designed by the MNO. In the embodiment where the user chose not to participate in the BoosterX campaign (exemplified by stage 711), the BoosterX platform logs that inaction against the increment counter. In the embodiment that the user has not participated in fewer than the threshold number of skipped campaigns, the BoosterX service will try sending the campaign again after another event. In one embodiment, at stage 715, the BoosterX service is complete and ends when (1) the user has chosen not to participate and (2) the increment counter threshold of non-participation has been exceeded.

Previously described BoosterX campaigns were network-generated and triggered based on the action of the subscriber. However, the BoosterX platform also allows for MNOs to design their own campaigns targeting all subscribers or a particular subset of subscribers in order to offer promotions or gain feedback from specific individuals.

Figure 8:
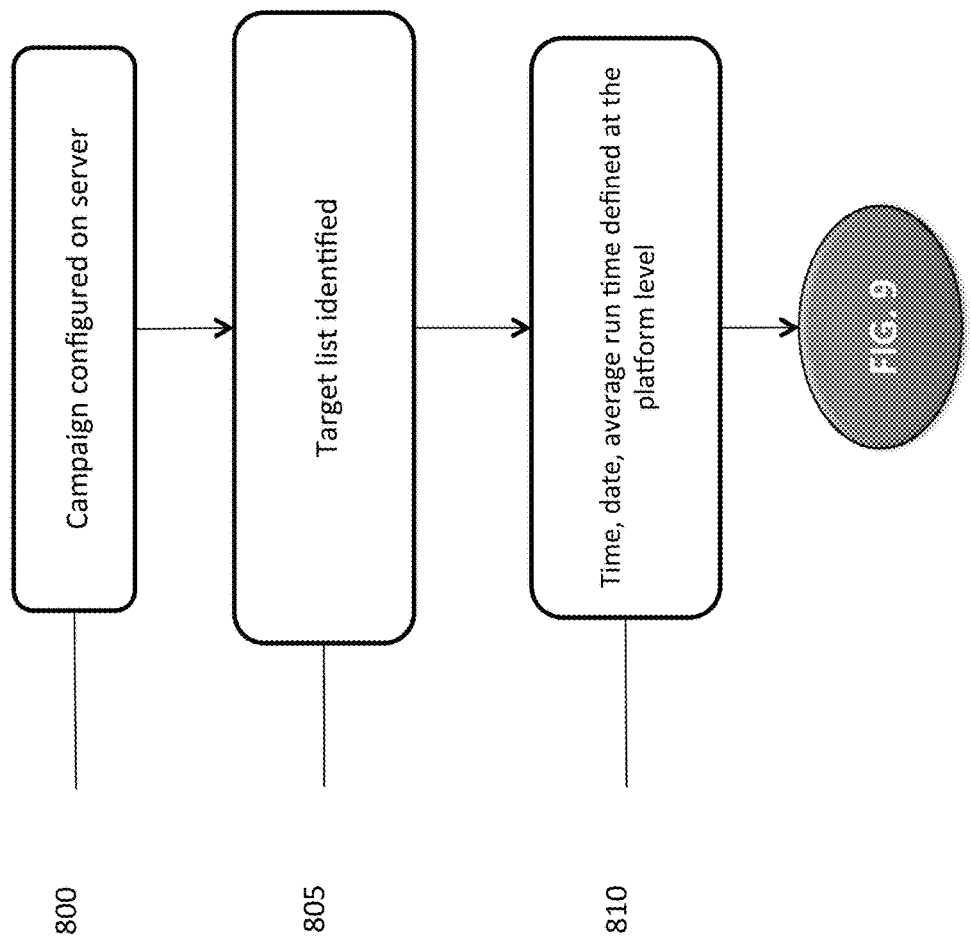
FIG. 8 is flowchart illustrating an exemplary process of how BoosterX campaigns are configured on the platform and how target subscriber lists are derived.

FIG. 8 outlines how the target list for a mass marketing campaign is identified. The process may include such a methodology that the criteria for selection is driven by (1) data from the MNO databases, (2) the BoosterX database of historical campaigns (e.g., a campaign that yielded successful purchases to a group of MSISDNs), or (3) it may be a list of manually added or uploaded numbers. For example, with the MNO database, one could target the numbers utilized within a certain business for a given campaign. Or, using historical BoosterX data one could target affluent youth likely to respond, and with buying power.

In one embodiment, at stage 800, the campaign is configured on the BoosterX server. At stage 805, the targeted subscriber list is identified. This list may take the form of a list of MSISDNs (phone numbers) based on criteria pulled from (1) other network databases, (2) the BoosterX database of historical campaigns, (3) an uploaded list of target numbers, or (4) a manually entered list). At stage 810, the time, date, and average run time (i.e. the length of days a campaign will run) can be defined at the platform level. A combination of the parameters at stages 800, 805, and 810 can also be configured for a campaign. From this point the campaign proceeds to launch (see FIG. 9, stage 900 for details).

Figure 9:
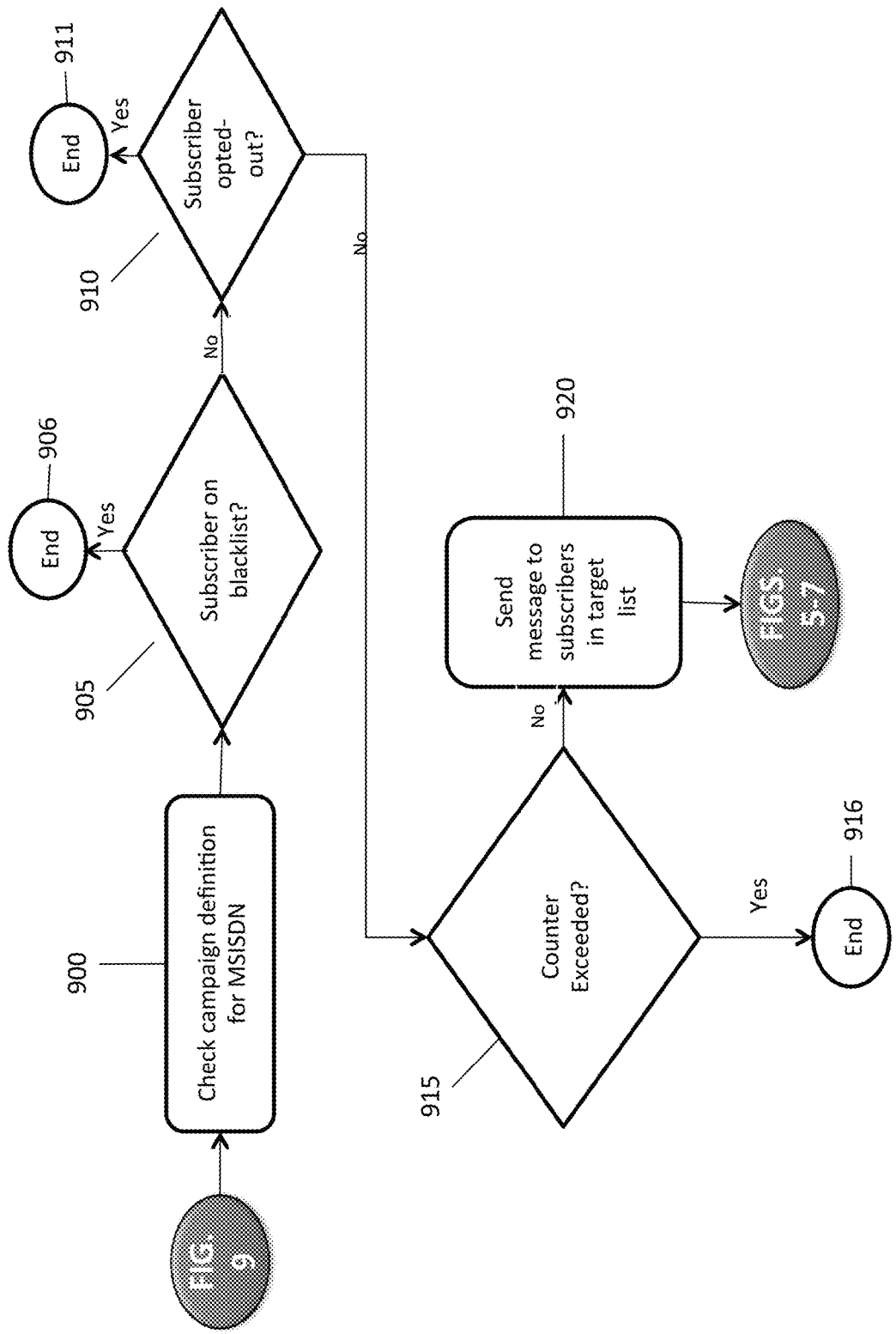
FIG. 9 is a flowchart illustrating an exemplary process of how the BoosterX platform launches a campaign.

FIG. 9 outlines an exemplary process of how the BoosterX platform launches a campaign. In one embodiment, at stage 900, the BoosterX platform checks the campaign definition for each MSISDN in the target list. At stage 905, the BoosterX platform queries if the mobile subscriber is on a BoosterX blacklist. In the embodiment where the user's phone is on a BoosterX blacklist, the process proceeds to stage 906 and the BoosterX campaign ends. If the user is not on a BoosterX blacklist, the campaign proceeds to stage 910, at which time the BoosterX platform queries if the user has opted-out of receiving promotions. If the user has opted-out of receiving promotions, the process proceeds to stage 911 and the BoosterX campaign ends. If the user has not opted-out of receiving promotions, the BoosterX campaign proceeds to stage 915, at which the BoosterX platform checks if counters (e.g., defining how many promotions a user should see or how many "No" responses have been received from a user) have been reached. If counters have been exceeded for any particular user, that subscriber is not targeted with the campaign and processing for that MSISDN ends at stage 916.

If counters have not been exceeded, then the BoosterX platform sends the targeted MSISDN the campaign message, exemplified by stage 920. By following this exemplary process in FIG. 9, this campaign message would be sent to all subscribers in the target list who abide by counter limits and campaign service definitions. From this point the campaign proceeds as described above.

Figure 10:
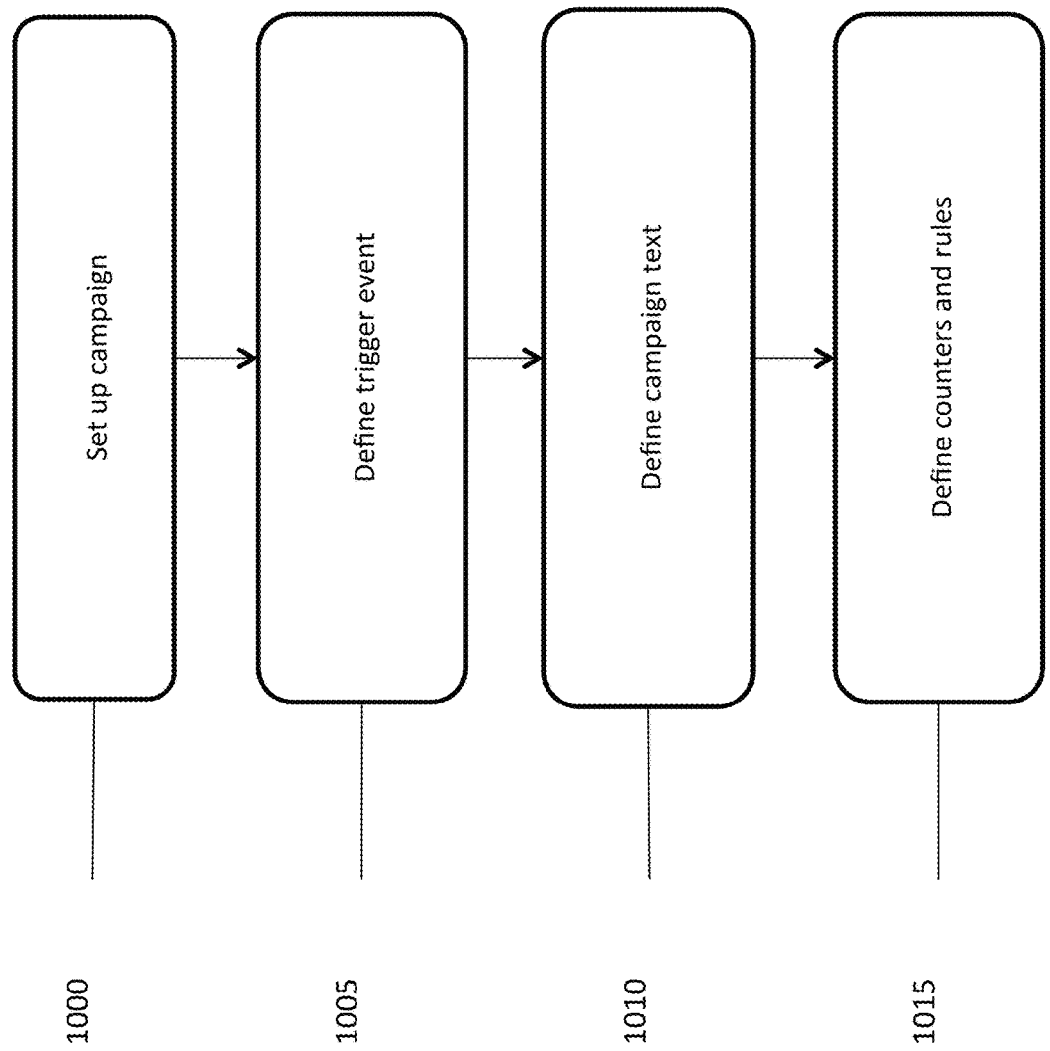
FIG. 10 is a flowchart illustrating an exemplary process of how a BoosterX campaign is designed.

FIG. 10 outlines an exemplary process of how a BoosterX campaign is configured within the BoosterX platform. In one embodiment, at stage 1000, an administrator sets up a new campaign. At stage 1005, the trigger event for the campaign is defined. The display text that will be shown to targeted mobile subscribers is defined at stage 1010. In stage 1015, the counters and rules (i.e., the number of times a subscriber may be asked to participate given the destination address is triggered) are defined.

Figure 11:
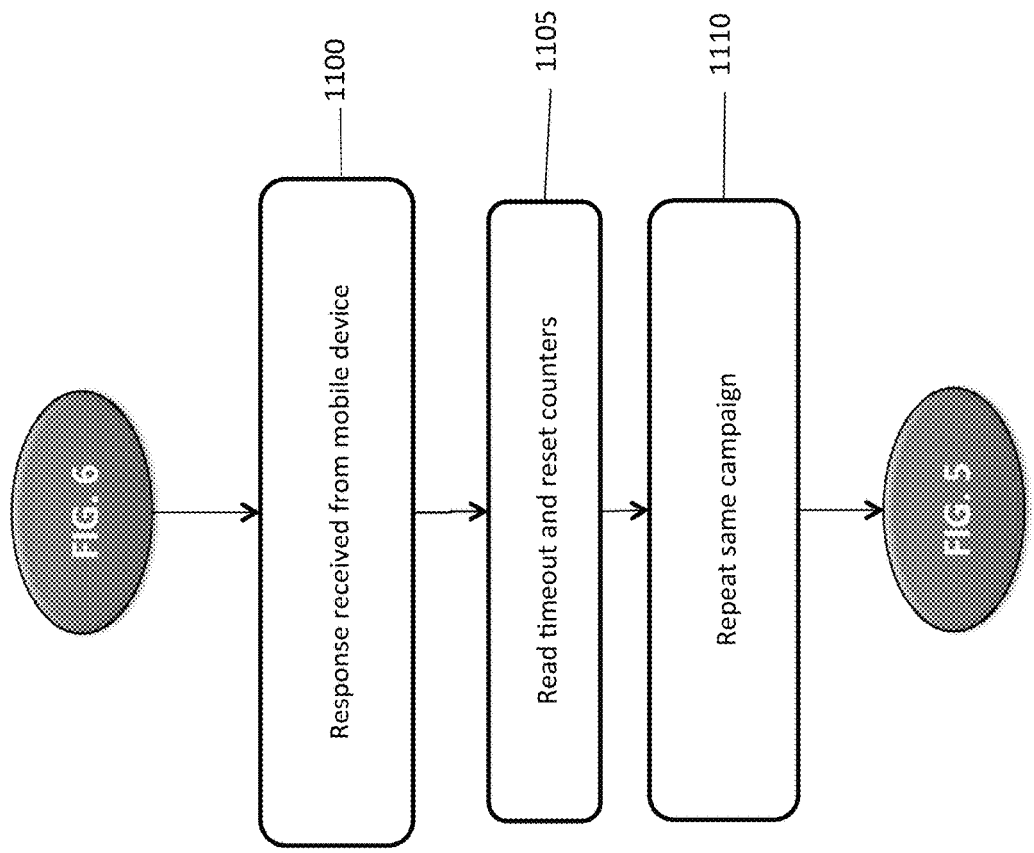
FIG. 11 is a flowchart illustrating an exemplary process of how the BoosterX Automatic Retries are triggered and carried out on the platform.

FIG. 11 outlines an exemplary process of how BoosterX Automatic Retries are triggered. Responses collected from a campaign (as in FIG. 6, stage 600) may vary significantly, and may include: (1) Subscriber responded "Yes" on the screen, (2) Subscriber responded "No" on the screen, (3) Subscriber pushed "Cancel" on the screen, (4) Subscriber pushed "Back" on the screen, (5) "No action" taken by subscriber and screen display timed out, (6) There is no response at all, (7) The mobile device is currently unable to process the display the campaign command, and (8) The device responds "Unknown error". In some embodiments, responses 1-4 give the BoosterX platform a clear understanding of the nature of their response, however responses 5-8 meet the criteria for automatic retries. Many factors may have caused scenarios 5-8 to occur such as: The subscriber's phone was turned off, the subscriber was beyond network coverage, the subscriber most likely did not hear/see the campaign, the subscriber was doing something else on the mobile device that interfered with the campaign.

In some embodiments, at stage 1100, the BoosterX platform receives a response which qualifies for automatic retries because it does not clearly respond to the campaign. This may be due to any of the following: (1) Subscriber screen timed out, (2) There is no subscriber response, (3) The mobile device is unable to process the campaign, or (4) The device responds with "Unknown error". In one embodiment, at stage 1105, where one of the above four (4) conditions are met then the platform proceeds to read the reset counters to determine the appropriate number of times to retry a given campaign. In the embodiment exemplified by stage 1110, the platform proceeds to repeat the same campaign with a configurable retry profile (including time interval and number of attempts). From this point the campaign proceeds as described above.

Figure 12:
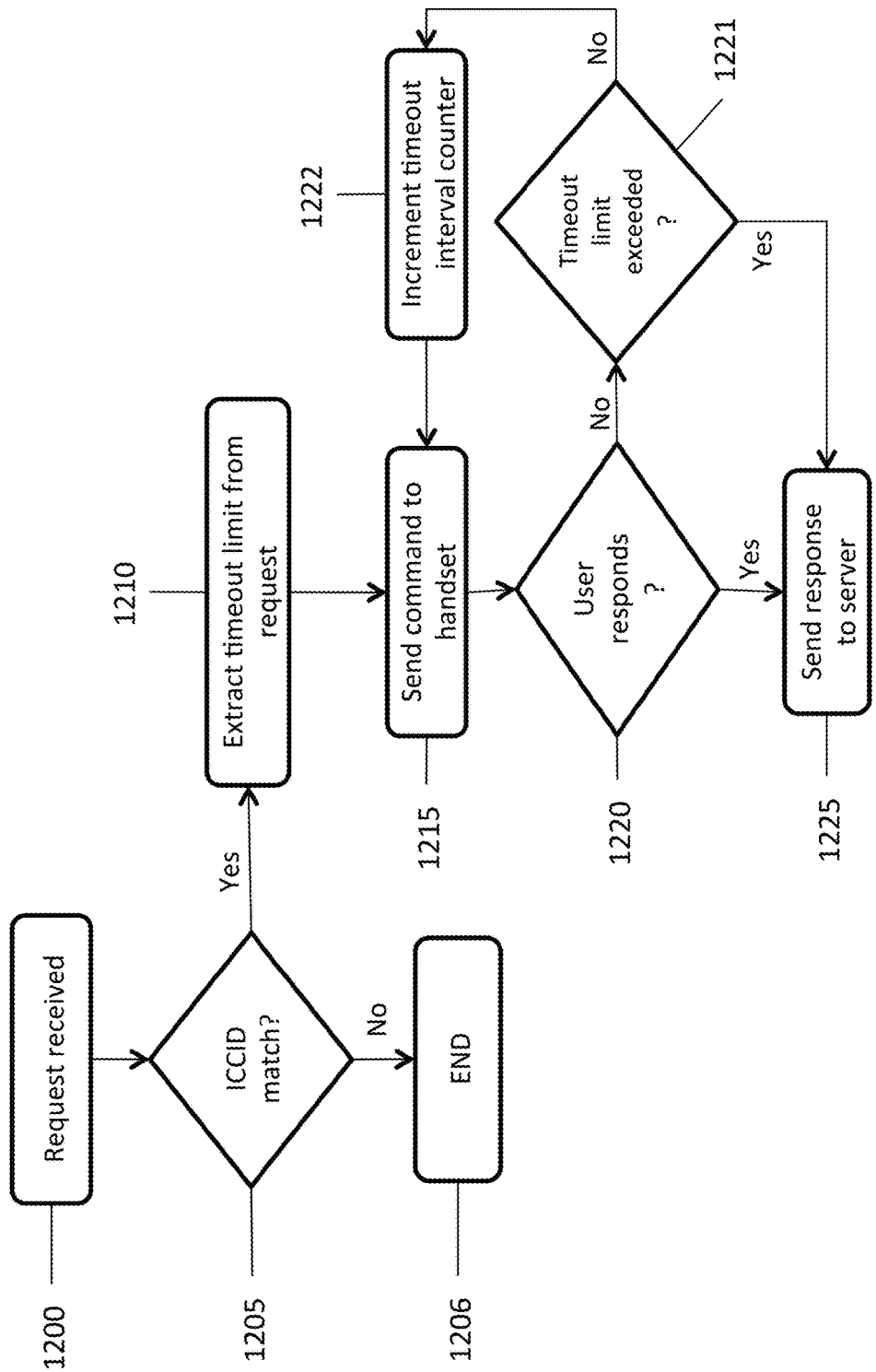
FIG. 12 is a flowchart illustrating an exemplary process of how the Automatic Retries process is carried out by the BoosterX application.

FIG. 12 outlines an exemplary process of how the Automatic Retries process is executed by the BoosterX client application. In one embodiment, at stage 1200, the repeat campaign request is received at the handset. At stage 1205, the remote client application proceeds to check the ICCID sent from the platform within the command message with the ICCID of the SIM card within the user's device. If the ICCID does not match, then the security check fails at stage 1205, the request is dropped and the process ends at stage 1206. This ends the process of Automatic Retries for that MSISDN for a particular campaign. If the ICCIDs match, the security check is passed, and the BoosterX application proceeds to extract the timeout limit from the request, as exemplified by stage 1210. The timeout limit refers to the amount of time the message should be displayed on the screen with no action from the user. At stage 1215, the campaign command is sent to the mobile subscriber's handset.

In the embodiment where the mobile subscriber has sees the promotion and provides a response at stage 1220, a message with the user's chosen response is sent back to the server platform at stage 1225, ending the Automatic Retries process. In the scenario where the subscriber does not provide an immediate response, the promotion will remain active on the subscriber's device screen for a limited time period before it disappears ("times out"). This timeout period is defined at the platform level and is configurable. The timeout period is sent to the remote client application as part of a command message. The client application applies the timeout limit at stage 1221 and continues to display the screen until the limit is reached. The time period can be configured for any range of time. In one embodiment, the timeout period may be set to 30 seconds, meaning the promotional message will only display to a user for 30 seconds. In other embodiments, the timeout could be several minutes, several hours, or could be set to an indefinite amount. In the embodiment where the timeout is configured to be an indefinite amount, the promotional screen will be displayed on the user's device until the user actions the screen (provides a response) or until the device is turned off.

If the timeout limit is reached, the display screen disappears and a response is sent to the server at stage 1225, indicating that the screen timed-out and that there was no response from the user. On some mobile devices, a screen can only be displayed for 30-60 seconds due to technical constraints. To ensure the BoosterX promotion can display for a greater length of time on all devices, the remote application can manage the timeout process via a series of counters and re-issued commands. In this embodiment, a maximum timeout counter is defined. The remote client application will display a promotion for a given time interval (30-60 seconds) supported by the device. When this time limit is reached, the client application will check if the maximum timeout limit has been exceeded. If it has not been exceeded, the client application will increment a timeout interval counter and will re-issue a display command to the device at stage 1222, which ensures the display prompt remains active on the device.

Figure 13:
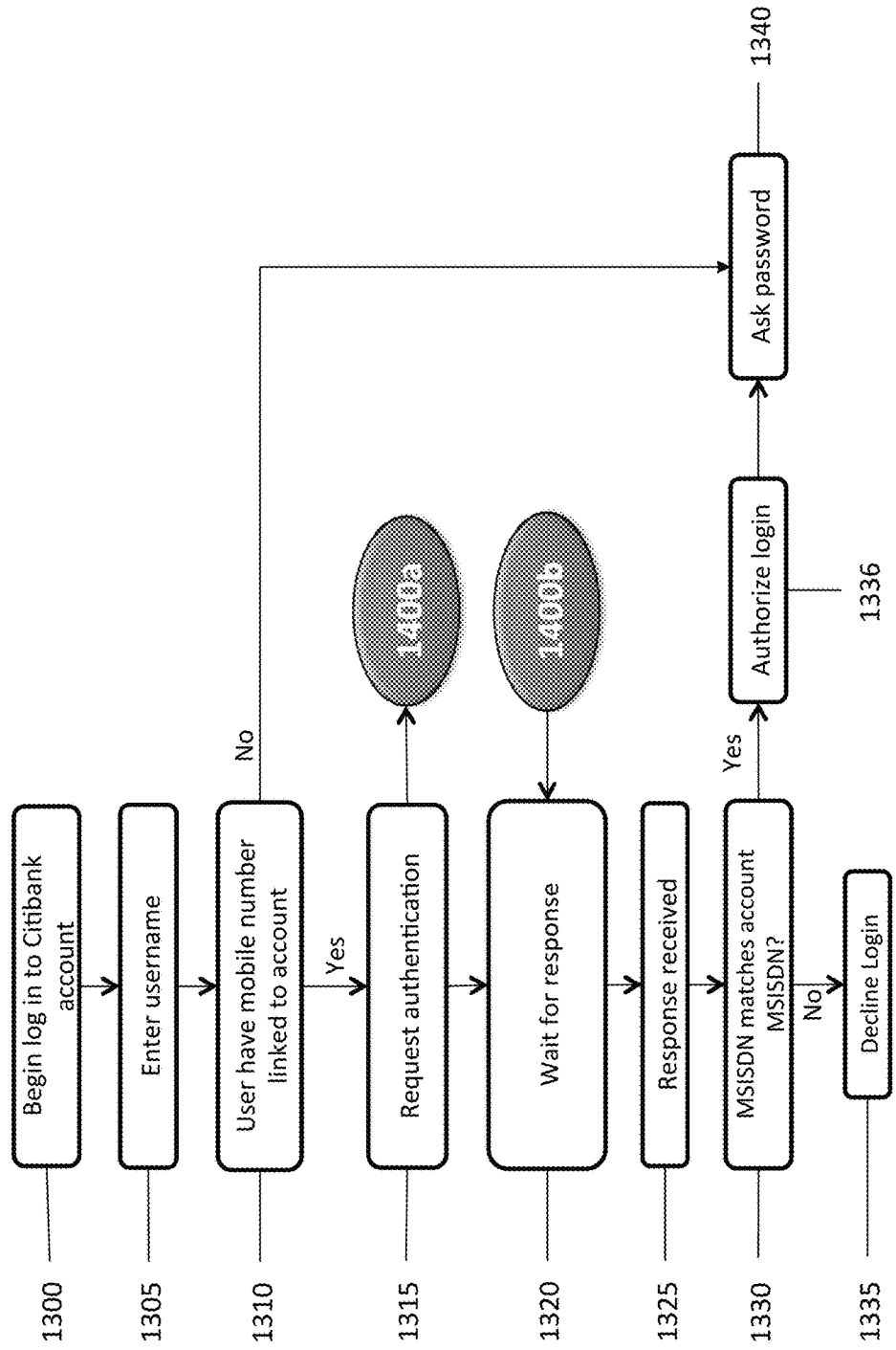
FIG. 13 is a flowchart illustrating an exemplary AuthenXicator embodiment that provides a level of encryption and protection when customers are signing on to an online bank account from a mobile or computer browser.

FIG. 13 outlines the exemplary process of utilizing BoosterX to provide another level of encryption and protection when customers are signing on to an online bank account from a mobile or computer browser. As used herein, the term "AuthenXicator" refers to aspects and embodiments of these verification processes that are a subset of the BoosterX platform. The term "AuthenXicator" can refer to a specific embodiments or to all embodiments collectively.

In this example, the AuthenXicator mobile subscriber will be called Joe. In one embodiment, at stage 1300, Joe (the exemplary mobile subscriber) attempts to log into his Citibank account via a browser while online on either his phone or computer. At stage 1305, Joe enters his username. Citibank will then query if Joe has a mobile number linked to his account, exemplified by stage 1310. In an embodiment where Joe does not have a mobile number linked to his Citibank account, Citibank will proceed to ask him for a password without utilizing AuthenXicator, the BoosterX check (stage 1340).

In an embodiment where Joe does have a mobile number linked to his Citibank account, Citibank will request authentication of his mobile phone number (MSISDN) (at stage 1315). From this point, authentication of a Joe's mobile phone number proceeds to BoosterX's cloud server (see FIG. 14, stage 1400).

After requesting authentication, Citibank proceeds to wait for the BoosterX response verifying Joe's phone number (exemplified by stage 1320). At stage 1325, the response is received. At stage 1330, Citibank must assess whether the MSISDN matches the MSISDN that is listed on Joe's account. At stage 1335, in which the MSISDN does not match that which is listed on Joe's account, Citibank declines Joe's attempt to log in to his account via his phone/computer web browser. At stage 1336, in which the MSISDN does match that which is listed on Joe's account, Citibank authorizes Joe's login. At stage 1340, Citibank asks Joe for his password. Upon its correct entry, Joe may log in to his account securely.

Figure 14:
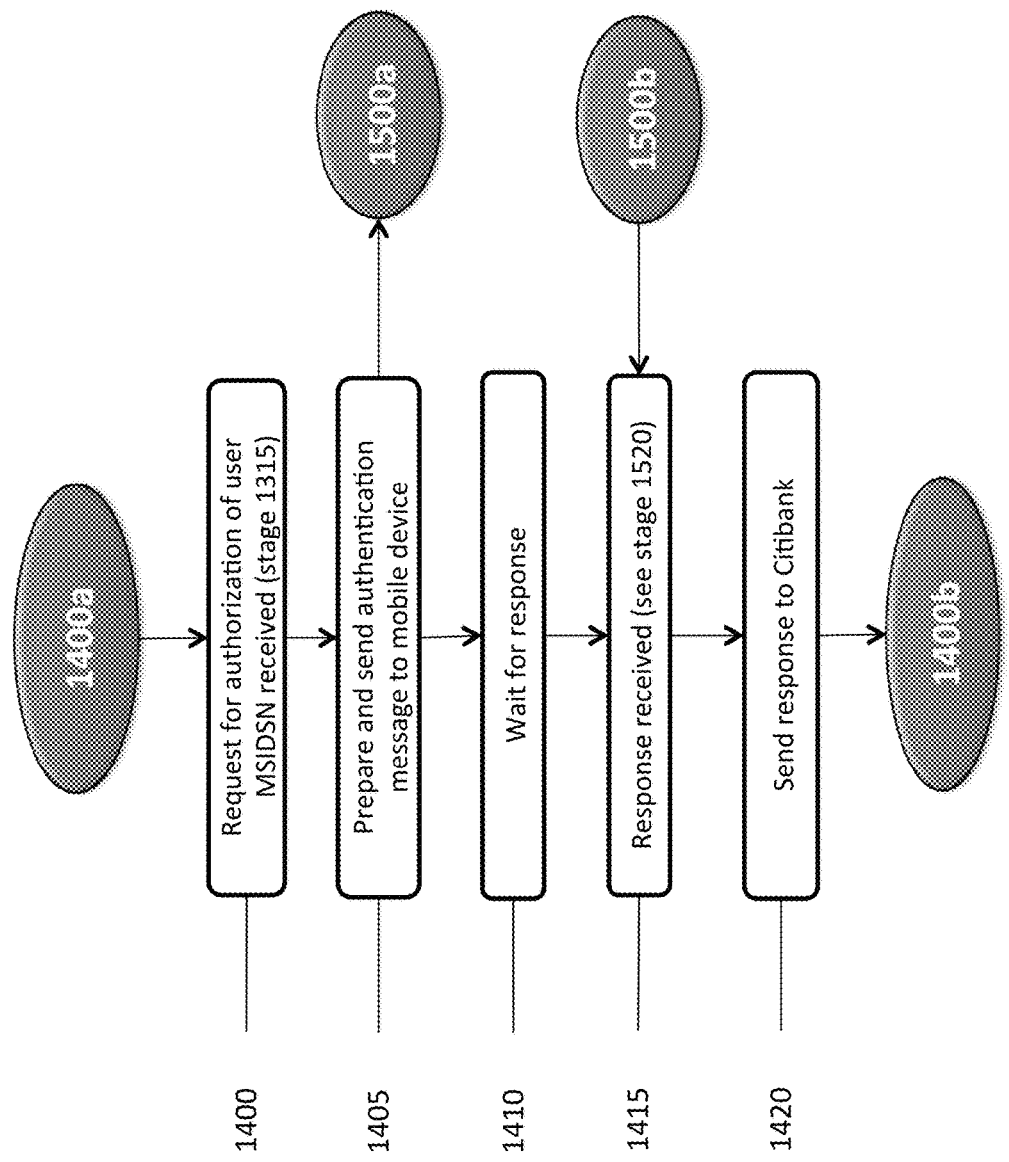
FIG. 14 is a flowchart illustrating an exemplary embodiment of the interactions between an MNO cloud and an AuthenXicator authorization request and the BoosterX mobile application in order to confirm or deny authorization.

FIG. 14 outlines an exemplary process of how the MNO interacts with the AuthenXicator authorization request as well as with the BoosterX platform in order to confirm or deny authorization. In this exemplary flow, Joe will be maintained as our example mobile subscriber. At stage 1400, the MNO receives a request for the authorization of user MSISDN (triggered via Joe inputting his username, which is linked to a phone number, into a Citibank login via his computer or phone web browser at stage 1315). At stage 1405, the BoosterX Cloud prepares and sends an authentication message to the BoosterX mobile application. From this point, the AuthenXicator process proceeds via the mobile device/application (see FIG. 15, stage 1500). After requesting authentication from Joe's mobile device, the BoosterX platform proceeds to wait for a response from the device (exemplified by stage 1410).

At stage 1415, the BoosterX platform receives a response relating the authorization of Joe's phone number (received via stage 1520). At stage 1420, the BoosterX platform sends the response to Citibank. From this point, the process proceeds via the internet and according to Citibank's login architecture (see FIG. 13, stage 1325).

Figure 15:
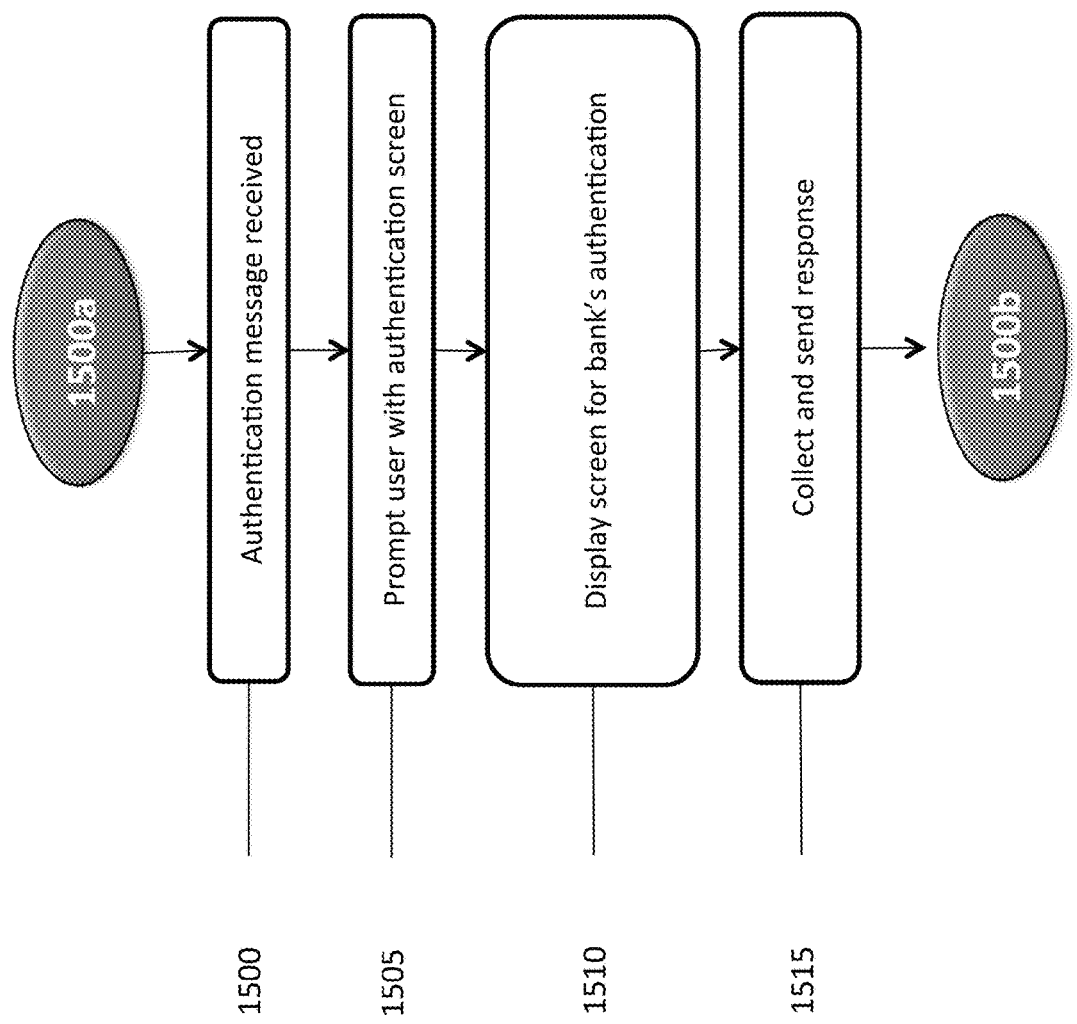
FIG. 15 is a flowchart illustrating the exemplary process of how the AuthenXicator request appears to a subscriber and how the subscriber interacts with the display to confirm or deny authorization.

FIG. 15 outlines an exemplary process of how the AuthenXicator request appears to the subscriber and how the subscriber may interact with the display to confirm or deny authorization. In this exemplary flow, Joe will be maintained as our example mobile subscriber. At stage 1500, Joe's device receives an authentication message via the BoosterX platform on the MNO Cloud (see FIG. 14, stage 1405). At stage 1505, Joe's device proceeds to prompt him with an authentication screen. At stage 1510, the Citibank Authentication screen is displayed (e.g., "Please click 'ok' in order to log in to your Citibank account." Response options may include "Ok", "No", and "Cancel".) At stage 1515, Joe's response is collected (e.g., either "Ok", "No", or "Cancel") and sent to the BoosterX platform (see FIG. 14, stage 1415). From this point, the AuthenXicator process proceeds via the MNO Cloud Server.

EQUIVALENTS

It is to be understood that the foregoing description is intended to illustrate and not limit the scope of the invention, which is defined by the scope of the appended claims. Those skilled in the art will recognize, or be able to ascertain, using no more than routine experimentation, numerous equivalents to the specific embodiments described specifically in this disclosure. Such equivalents, and other aspects, advantages, and modifications are within the scope of the following claims.

The invention claimed is:
1. A computer-implemented method for automatically prompting a targeted user to respond to a targeted campaign offer from a Mobile Network Operator on a targeted mobile device, the method comprising:
  receiving, at a server, a plurality of Mobile Station International Subscriber Directory Numbers (MSISDNs) associated with a first plurality of mobile devices;
  receiving, at the server, a campaign definition from the Mobile Network Operator, wherein the campaign definition comprises criteria and an offer message;

selecting a target MSISDN from the plurality of MSIS-DNs, wherein the target MSISDN is associated with a target mobile device;

determining whether the target MSISDN matches the criteria;

creating a communication comprising:
   the offer message comprising one or more actionable response options; and
   executable instructions for displaying the offer message on the screen of the target mobile device;

sending the communication to the target MSISDN when the target MSISDN matches the criteria;

receiving, at the server, a communication comprising an actionable response option selected on the target mobile device;

logging the actionable response option selected on the target mobile device and the target MSISDN;

determining whether the actionable response option selected on the target mobile device was positive; and sending a sign-up message to a Mobile Network Operator comprising the target MSISDN of the target mobile device, a campaign code, and, optionally, the date and time, wherein the sign-up message is sent when the actionable response option selected on the target mobile device was positive.

2. The method of claim 1, wherein the offer message comprises an option from the Mobile Network Operator to upgrade a data or voice plan, an option from the Mobile Network Operator to renew a data or voice plan, or an offer to opt into a promotion offered by the Mobile Network Operator.

3. The method of claim 1, wherein the campaign definition comprises a campaign duration.

4. The method of claim 1, further comprising comparing the target MSISDN to a second plurality of MSISDNs stored in a database operably connected to the server.

5. The method of claim 1, further comprising comparing the target MSISDN to an opt-out list stored in a database operably connected to the server, wherein the opt-out list comprises one or more MSISDNs that have opted out of receiving offer messages.

6. The method of claim 1, further comprising comparing the target MSISDN to a blacklist stored in a database operably connected to the server, wherein the blacklist comprises one or more MSISDNs that a Mobile Network Operator desires to prevent from receiving offer messages.

7. The method of claim 1, further comprising:
   receiving, at the server, the device type of the target device; and
   comparing the device type of the target mobile device to a banned list of device types stored on a database operably connected to the server, wherein the banned list of device types comprises one or more device types that should not receive offer messages.

8. The method of claim 1, further comprising
   determining whether a previous offer message has been sent to the target MSISDN, thereby identifying a contacted mobile device if a previous offer message has been sent to the target MSISDN;
   counting how many previous offer messages have been sent to the contacted mobile device, thereby identifying a number of sent previous offer messages; and
   comparing the number of sent previous offer messages to a limit amount, wherein an offer message is not sent to the contacted mobile device if the number of sent previous offer messages is greater than or equal to the limit amount.

9. The method of claim 1, wherein the sign-up message further comprises a short code.

10. The method of claim 1, further comprising sending a follow-up message to the target mobile device, the follow-up message comprising one or more of a confirmation message or a thank you message.

11. The method of claim 1, further comprising updating a counter database with the positive or negative response, wherein the counter database counts the positive and negative responses received.

12. The method of claim 1, further comprising
   receiving, at the server, a non-responsive communication from a second target mobile device;
   preparing a second offer message comprising one or more second actionable response options; and
   sending the second offer message to the second target mobile device,
   wherein a non-responsive communication from the second target mobile device of the second plurality of mobile devices indicates at least one of the following occurred on the mobile device: no first actionable response option was selected on the device, the first offer message disappeared from the screen after a timeout setting was met, the mobile device was unable to display the offer message, or an unknown error occurred on the mobile device.

13. The method of claim 12, further comprising updating an offer message counter database, wherein the number of offer messages sent to the MSISDN associated with the second target mobile device is increased by one.

14. The method of claim 1, wherein the criteria comprises at least one of a list of target MSISDNs, a campaign duration, a maximum number of targeted mobile devices, a list of mobile devices that have previously expressed interest in an offer, previously targeted mobile devices from a previous campaign, data from the Mobile Network Operator, a list of mobile devices used in a certain type of business, and the level of wealth associated with a list of MSISDNs.

* * * * *